United States Patent [19]

Shah et al.

[11] 3,789,145

[45] Jan. 29, 1974

[54] METHOD, AND APPLICATION THEREOF, FOR TRANSMITTING INFORMATION OVER A COMMON SIGNAL PATH

[75] Inventors: Arvind Shah, Zurich; Frank Furrer, Effretikon, both of Switzerland

[73] Assignee: Gesellschaft zur Froderung der Forschung an der Eidg. Techn. Hochschule, Zurich, Switzerland

[22] Filed: July 13, 1972

[21] Appl. No.: 271,623

[30] Foreign Application Priority Data

Oct. 5, 1971 Switzerland........................ 14490/71

[52] U.S. Cl. ............................................ 179/15 BC

[51] Int. Cl. ............................................ H04j 3/00

[58] Field of Search ................................ 179/15 BC

[56] References Cited

UNITED STATES PATENTS

| | | | |
|---|---|---|---|
| 3,659,053 | 4/1972 | Low | 179/15 BC |
| 3,697,697 | 10/1972 | Audretsch | 179/15 BC |
| 3,705,981 | 12/1972 | Harmuth | 179/15 BC |

*Primary Examiner*—Ralph D. Blakeslee
*Attorney, Agent, or Firm*—Woodhams et al.

[57] ABSTRACT

A method whereby units of information supplied simultaneously over n separate signal channels can be transmitted simultaneously over a common signal path with the aid of n carrier signals, each associated with one of the signal channels, the units of information being impressed on such carriers. The carrier signals consist of n different functions $F_1(t)$ to $F_n(t)$ which are orthonormal to each other. Each function is repeated at the expiration of a cycle beginning at the same instant $t_o+k$T for all said functions and having the same duration T and which, for any index values $\mu$ and $\nu$ lying between $l$ and $n$ for any positive integer values $k$, fulfill the condition $$\frac{1}{T}\int_{t_o+kT}^{t_o+(k+1)T} F_\mu(t)\cdot F_\nu(t)\,dt = \begin{cases} 0 & \text{for } \mu\neq\nu \\ \text{const.} & \text{for } \mu=\nu. \end{cases}$$

The carrier signals are superposed on a common signal path so that a summation signal S($t$) is formed and transmitted over the common signal path. The units of information on any $m^{th}$ signal channel and incorporated in the summation signal are filtered out again, after a transmission of duration $\Delta t_m$, with the assistance of the integration $$\frac{1}{T}\int_{t_o+kT+\Delta t_m}^{t_o+(k+1)T+\Delta t_m} S(t-\Delta t_m)\cdot F_m(t-\Delta t_m)\,dt$$

by synchronous correlation between a time shifted summation signal and a time function in period synchrony with such summation signal and corresponding to the carrier signal with the $m^{th}$ signal channel.

30 Claims, 12 Drawing Figures

METHOD, AND APPLICATION THEREOF, FOR TRANSMITTING INFORMATION OVER A COMMON SIGNAL PATH

The invention relates to a method whereby units of information supplied simultaneously over $n$ separate signal channels can be transmitted simultaneously over a common signal path with the aid of $n$ carrier signals, each associated with one of the signal channels, on which carriers the units of information supplied over the respective signal channels are impressed, the carrier signals employed consisting of $n$ different functions $F_1(t)$ to $F_n(t)$ of time $t$, orthonormal to one another, each of which is repeated at the expiration of a cycle beginning at the same instant $t_o + k$T for all functions $F_1(t)$ to $F_n(t)$ and having the same duration T and which, for any index values $\mu$ and $\nu$ lying between $l$ and $n$ and for any positive integer values $k$, fulfil the condition $$\frac{1}{T}\int_{t_o+kT}^{t_o+(k+1)T} F_\mu(t)\cdot F_\nu(t)dt = \begin{cases} 0 & \text{for } \mu\neq\nu \\ \text{const.} & \text{for } \mu=\nu. \end{cases}$$

the carrier signals on which the information from the respective signal channels have been impressed being superimposed on the common signal path so that a summation signal $S(t)$ is formed and transmitted over the common signal path, the units of information supplied over any $m^{th.}$ signal channel and incorporated in the summation signal being filtered out again, after transmission of duration $\Delta t_m$, with the assistance of the integration $$\frac{1}{T}\int_{t_o+kT+\Delta t_m}^{t_o+(k+1)T+\Delta t_m} S(t-\Delta t_m)\cdot F_m(t-\Delta t_m)dt$$

by synchronous correlation between the summation signal $S(t-\Delta t_m)$ that has undergone a time-shift equal to the transmission time $\Delta t_m$ and a time function $F_m(t-\Delta t_m)$ in period synchrony with the summation signal $S(t-\Delta t_m)$ and corresponding to the carrier signal for the $m^{th.}$ signal channel.

One such method is already known from U.S. Pat. No. 2,204,035. According to this known method, what are termed "Walsh functions" are used as carrier signals $F_1(t)$ to $F_n(t)$ and the units of information supplied over each of the associated signal channels are impressed on those carrier signals by amplitude modulation of the latter; in other words, modulation signals containing the information to be transmitted are supplied over the various signal channels in the manner known from carrier-frequency telephony, for instance, and the carrier signals allotted to the signal channel concerned are amplitude-modulated on a multiplication basis by the said modulation signals with the aid of, for example, the usual ring modulators, such as have likewise been made familiar by carrier-frequency telephony. However, in such methods as these, this way of impressing the information for transmission on the carrier signals has one basic drawback, inherent in the system. This arises from the fact that the filtering-out of the units of information supplied over any $m^{th.}$ channel, for example, from the summation signal $S(t)$ transmitted over the common signal path and consisting of the superimposed carrier signals on which the information has been impressed, is carried out, as already stated, with the assistance of the integration $$\frac{1}{T}\int_{t_o+kT+\Delta t_m}^{t_o+(k+1)T+\Delta t_m} S(t-\Delta t_m)\cdot F_m(t-\Delta t_m)dt$$

This is because, if the information is to be contained in a modulation signal, that signal must be variable with time. That is to say that if $a$ is the amplitude of the modulation signal, that signal must be of the form $a(t)$. Accordingly, when the carrier signals formed by the said functions $F_\mu(t)$, with $\mu = l$ to $n$, have impressed on them, by amplitude modulation on the basis of multiplication, the units of information formed by a modulation signal $a_\mu(t)$ and supplied over the particular $\mu^{th.}$ signal channel concerned, the form of the modulated carrier signals will be $a_\mu(t)\cdot F_\mu(t)$ and the form of the summation signal formed by superimposition of the modulated carrier signals will be $$S(t) = \sum_{\mu=1}^{n} a_\mu(t)\cdot F_\mu(t).$$

The integral referred to above, by the formation of which the units of information supplied over any $m^{th.}$ signal channel and transmitted by the summation signal are filtered out again from the summation signal, thus becomes (assuming for the sake of simplicity of representation that the duration of transmission of the summation signal over the common signal path for all channels is negligibly small and that $\Delta t_m$ may therefore be equated with zero):

$$\left[\frac{1}{T}\int_{t_o+kT+\Delta t_m}^{t_o+(k+1)T+\Delta t_m} S(t-\Delta t_m)\cdot F_m(t-\Delta t_m)dt\right]_{\Delta t_m=0} = \frac{1}{T}\int_{t_o+kT}^{t_o+(k+1)T} S(t)\cdot F_m(t)dt = \frac{1}{T}\int_{t_o+kT}^{t_o+(k+1)T}\left[\sum_{\mu=1}^{n} a_\mu(t)F_\mu(t)\right]\cdot F_m(t)dt$$

and the integral thus obtained corresponds, according to the universally valid rules of integration, to the summation $$\sum_{\mu=1}^{n}\frac{1}{T}\int_{t_o+kT}^{t_o+(k+1)T} a_\mu(t)F_\mu(t)F_m(t)dt$$

The filtration by integration already mentioned now rests basically on the condition of orthogonality quoted in the preamble, namely $$\frac{1}{T}\int_{t_o+kT}^{t_o+(k+1)T} F_\mu(t)\cdot F_\nu(t)\,dt = \begin{cases} 0 & \text{for } \mu\neq\nu \\ \text{const.} & \text{for } \mu=\nu. \end{cases}$$

for the time functions $F_1(t)$ to $F_n(t)$ used as the carrier signals; for according to that — and on the assumption that all $a_\mu(t)$ in the period under consideration, from $t_o+kT$ to $t_o+(k+l)T$, could be regarded as constant — all integrals contained in the above summation in which $\mu\neq m$ would equal zero and all that would remain of the entire summation would be the integral $$\left[\frac{1}{T}\int_{t_o+kT}^{t_o+(k+1)T} a_\mu(t)F_\mu(t)F_m(t)\,dt\right]_{\mu=m}$$

which — again assuming a constant $a_m(t)$ over the integration period — would equal the integral $$a_m(t)\cdot\frac{1}{T}\int_{t_o+kT}^{t_o+(k+1)T} F_m(t)\cdot F_m(t)\,dt$$

and hence, according to the said condition of orthonormality, would be equal to $a_m(t)$ . const. . The integral $$\left[\frac{1}{T}\int_{t_o+kT+\Delta t_m}^{t_o+(k+1)T+\Delta t_m} S(t-\Delta t_m)\cdot F_m(t-\Delta t_m)\,dt\right]_{\Delta t_m=0} = a_m(t)\cdot\text{const.}$$

obtained for filtering out the modulation signal $a_m(t)$, containing the units of information supplied over the $m^{th.}$ signal channel, from the summation signal $S(t)$, would therefore in fact again give, by way of integration result, the modulation signal $a_m(t)$ multiplied by a constant factor "const.."

This form of filtering, however, can function only if all modulation signals $a_l(t)$ to $a_n(t)$ in the integration period from $t_o+kT$ to $a_n(t)$ in the integration period from $t_o+kT$ to $t_o+(k+l)T$ can actually be regarded as constant, for if the modulation signals $a_l(t)$ to $a_n(t)$ during the integration time vary in value, then in the above summation $$\sum_{\mu=1}^{n}\frac{1}{T}\int_{t_o+kT}^{t_o+(k+1)T} a_\mu(t)F_\mu(t)F_m(t)\,dt$$

none of the integrals in which $\mu\neq m$ becomes equal to zero, but each such integral, at the end of the integration period, produces an integration result differing from zero, and moreover that integral in which $\mu=m$ is not equal to $a_m(t)$. const., but even this integral produces a result differing from this desired integration result. The integration results differing from zero, produced by integrals in which $\mu\neq m$, will then appear in the "filtered-out" signal as noise and cross-talk, and the integration result differing from $a_m(t)$.const., produced by the integral in which $\mu=m$, as distortion of the signal $a_m(t)$.const., which should be filtered out. That being so, it is clear that in the case of a large number of signal channels, the noise and cross-talk components will become so large that, when account is taken of the additional distortion of the signal to be filtered, proper signal recognition is hardly possible any longer; in other words, filtering-out, in the method already known, ceases to function when the modulation signals $a(t)$ containing the information undergo amplitude variation with time during the formation of the said integrals used for filtering purposes.

As has already been stated, however, the modulation signals can contain information only if they vary with time or have the form $a(t)$ ; and the basic drawback inherent in the system, referred to earlier as being applicable to the said known method, arises from the contradiction that the modulation signals should have constant amplitude on the one hand, for satisfactory filtering, but, on the other hand, can contain and carry information only when their amplitude varies with time.

In the known method, an attempt has therefore been made to counteract this inherent drawback by the use of additional means whereby — artificially, as it were — the amplitude of the modulation signals might be held constant during the integration time.

There are fundamentally two possible ways of achieving the purpose of keeping the modulation signal amplitudes substantially constant during the integration time. Either the variation in modulation signal amplitude can be made so small during integration that the amplitude may be regarded as substantially constant, or one can hold the modulation signal amplitude constant artificially by taking the actual modultion signal in each instance only at the start of an integration time, maintaining the amplitude taken unchanged independently of the variation with time of the actual modulation signal until the end of the integration time, and then taking the signal anew.

The first of these two possibilities, however, has the disadvantage that when the oscillation time of the modulation signal, even if a 5 percent amplitude variation were allowed during the integration time, would have to be about 100 times as great as the cycle duration of the said Walsh functions, which means to say that if, for example, it were desired to transmit a speech-frequency band of up to 3.4 kc./s., the repetition frequency of the Walsh functions employed as carrier signals would have to be at least 340 kc./s. Since, moreover, every cycle of the Walsh functions is divided into more time divisions than there are signal channels and one functional change must have taken place in the Walsh functions within about one-tenth of the length of such a time division, one such Walsh function change would necessarily take place, given say 100 signal channels, within one-thousandth of the duration of a Walsh function cycle, which means that the common signal path over which the Walsh functions serving as carrier signals are transmitted would need to be still able to transmit satisfactorily a frequency 1,000 times as high as the repetition frequency of the Walsh functions, for which purpose the common signal path in the example considered, i.e. with 100 speech-frequency channels of up to 3.4 kc./s., should have a bandwidth of at least 340 Mc./s. If one considers this in the light of the fact that in normal carrier-frequency telephony systems, with suppressed carrier and with one sideband suppressed, a bandwidth of only about 400 kc./s. is needed to take the same 100 speech-frequency channels of up to 3.4 kc./s., it becomes clear at once that the first of the stated possibilities of keeping the modulation signal amplitudes constant during integration time is out of the question in practice.

Thus, only the second of the stated possibilities remains, whereby the actual modulation signal is taken in each instance only at the start of an integration time, the amplitude taken then being maintained unchanged independently of the variation with time of the actual modulation signal during the integration time; and in this case, in fact, the modulation signal may alter considerably during the integration time, that is to say that the oscillation time of the modulation signal need not be materially longer than the cycle of the Walsh functions used as carrier signals. Hence, this second possibility, unlike the first, results in acceptable bandwidths for the common signal path. That is why use is made of this second possibility in the method referred to as being already known.

Technically, however, this second possibility has two decisive disadvantages. In the first place, there is a considerable increase in the technical complication of the transmission system for taking the actual modulation signals and keeping the amplitudes taken constant till next taken on the transmitting side, as well as for correspondingly taking the integration resultants and keeping the amplitudes taken constant till next taken on the receiving side, because the means whereby this taking and keeping constant is carried out must be provided, of course, for every single channel. To this must be added the fact that the more closely the oscillation time of the modulation signal approaches the cycle duration of the Walsh functions used as carrier signals, the poorer does the correspondence become between the signal taken on the output side, which alters by degrees, and the actual modulation signal. Hence, to achieve transmission quality that is at all good, the oscillation time of the actual modulation signals must if possible be a multiple of the cycle duration of the Walsh functions, from which it naturally follows that, as explained with the said first possibility as an example, the band required for the common signal path becomes correspondingly wide. Furthermore — and this is of considerable importance with transmission systems of the type under consideration — a low-pass filter is then also needed at the output of every channel, if the frequencies and harmonics thereof taken are to be filtered out of the signals taken on the output side, which alter by degrees; for quite apart from the resultant extra cost and complication of this, such low-pass filters, in the case of transmission systems of the kind under discussion, are components foreign to the system; and the advantage of transmission systems of this type lies first and foremost in the fact that they can be assembled solely from digital components, which are easy to produce by the integrated circuit techniques of today, occupy very little space and, more particularly, are very cheap. The price of this advantage of transmission systems of the said type is basically that the transmission path band required must be far wider than that required in comparable transmission systems designed according to analogue technology, such as, for example, the carrier-frequency telephony systems already mentioned. It is most undesirable, obviously, that this advantage, bought at the cost of increased transmission-path bandwidth, should be nullified, partially at least, by the need to employ a large number of analogue components, namely one low-pass filter for every channel.

There has been no lack of attempts to eliminate the defect inherent in the known method already described by applying the basic concept of methods such as described in the preamble, thereby avoiding the particular disadvantages of the known method referred to above, and in particular the taking of the modulation signals and the maintenance of constant values when taken, as well as the additional equipment required for that purpose on the transmitting and receiving sides. In one method resembling those referred to in the preamble, which is covered by U.S. Pat. No. 3,470,324, this is achieved by virtue of the fact that after transmission, that is to say on the receiving side, instead of the integral $$\frac{1}{T}\int_{t_0+kT+\Delta t_m}^{t_0+(k+1)T+\Delta t_m} S(t-\Delta t_m)\cdot F_m(t-\Delta t_m)\,dt$$

it is merely the product $(S(t-\Delta t_m)\cdot F_m(t-\Delta t_m)$ that is formed, or, if again simplified by the assumption that $\Delta t_m$ is negligibly small, the product $S(t)\cdot F_m(t)$. This is because if, by way of summation signal $S(t)$, one inserts in this product the summation signal already referred to above, namely $$S(t)=\sum_{\mu=1}^{n} a_\mu(t)\cdot F_\mu(t).$$

resulting from superimposition of the modulated carrier signals and amplitude modulation by multiplication of the individual carrier signals $F_\mu(t)$ by the appropriate modulation signal $a_\mu(t)$, this product becomes the summation $$\sum_{\mu=1}^{n} a_\mu(t)\cdot F_\mu(t)\cdot F_m(t),$$

and in this summation the term $a_m(t)\cdot F_m(t)\cdot F_m(t)$, in which $\mu=m$, assuming that Walsh functions are used as carrier signals $F_1(t)$ to $F_n(t)$ as in the known method first mentioned, simply becomes equal once more to the modulation signal $a_m(t)$, because a Walsh function can assume only the two function values of +1 and −1 and the square of a Walsh function, when its function value is −1, is accordingly $(-1)\cdot(-1)=+1$ and, when its function value is +1, is similarly $(+1)\cdot(+1)=+1$, so that the summation term given above, $a_m(t)\cdot F_m(t)\cdot F_m(t)$, or $a_m(t)\cdot F_m^2(t)$, equals $a_m(t)\cdot(+1)$, or $a_m(t)$, whereas in the case of all other summation terms $a_\mu(t)\cdot F_\mu(t)\cdot F_m(t)$, in which $\mu\neq 1$, the product is always derived from a modulation signal $a\neq(t)$ and two different Walsh functions $F_\mu(t)$ and $F_m(t)$ and each such product contains only frequencies which lie above the repetition frequency $f_{F\mu}$ of the Walsh functions (which $f_{F_\mu}$ is equal to 1/T) less the modulation signal frequency $f_{a_\mu}$, that is to say above the frequency $(1/T-f_{a_\mu})$. All these summation terms $a_{\mu}(t) \cdot F_\mu(t) \cdot F_m(t)$ in which $\mu \neq m$ can therefore be readily separated by a low-pass filter from the summation term $a_\mu(t)\cdot F_\mu(t)\cdot F_m(t)$ in which $\mu \neq m$ and which amounts as already stated to $a_m(t)$, provided only that the modulation frequencies $f_{a\mu}$, or more precisely the maximum frequencies contained in or permissible for the modulation signals $a_\mu(t)$, are lower in all modulation signals than half the repetition frequency of the Walsh functions. Basically, then, with the latter of the known methods, covered by U.S. Pat. No. 3,470,324, unlike the former method, known from U.S. Pat. No. 3,204,035, the filtering is done not by integration via the product $S(t)\cdot F_m(t)$, but by separating the low-frequency modulation signal $a_m(t)$ contained in that product $S(t)\cdot F_m(t)$ from the remaining higher-frequency components of that product, by means of a low-pass filter. In the known method last mentioned, therefore, it is possible to dispense with the equipment described as being needed for the known method first mentioned for taking and for keeping constant the values taken on the transmitting and receiving sides; and yet, with the known method last mentioned, after filtering, there still arises on the receiving side the original modulation signal $a_m(t)$ supplied on the transmitting side, to regain which a low-pass filter is still required by the known method first mentioned, just as it is by the known method last mentioned. This latter thus has the advantage, over the known method first mentioned, that the said taking and constancy equipment can be dispensed with, but it also has over the known method first mentioned the not inconsiderable advantage that the modulation signals in the known method last mentioned must also be passed through low-pass filters on the transmitting side, to comply with the said condition that the modulation signal frequencies $f_{a_\mu}$ are lower than half the repetition frequency of the Walsh functons, while making the best possible use of the available transmission-path bandwidth; for to make the best possible use of the available transmission-path bandwidth calls for the upper limit of the modulation signal frequencies $f_{a_\mu}$ to be situated as close as possible to the maximum permissible half repeitition frequency of the Walsh functions, and in this case low-pass filters must be provided on the transmitting side as well, to cut off any undesirable higher frequencies contained in the modulation signals $a_m(t)$. In addition to this drawback, the known method last mentioned also suffers the disadvantage, compared to the known method first mentioned, that the low-pass filters on the receiving side, as well as the low-pass filters on the transmitting side, in the known method last mentioned — again assuming best posible use of the available transmission-path bandwidth — must be far more steep-sided than the low-pass filters required on the receiving side in the known method first mentioned. The known method last mentioned, even more than the known method first mentioned — because low-pass filters that are relatively steep-sided or provide relatively sharp band definition must be used on both transmitting and receiving sides for every single channel — resemble the generally known carrier-frequency telephony system, in which likewise the individual channel separation is achieved by relatively steep-sided low-pass filters provided on the transmitting and receiving sides and all other band transpositions are effected by ring modulators, the only material difference between the last-mentioned known method and the known carrier-frequency telephony system being that in the latter the various channel bandwidths are arranged neatly side by side in the frequency band available, whereas, in the known method last mentioned, they are all bunched together by the use of Walsh functions as carrier signals, though at the same time a far wider frequency band is required than in carrier-frequency telephony for the same number of channels.

The real advantage over the known carrier-frequency telephony system, obtainable by the use of Walsh functions, or in general terms functions that are orthonormal to one another, as carrier signals, which advantage alone justifies the frequency range of the common transmission path, far wider than in carrier-frequency telephony but necessary when orthonormal functions are used as carrier signals — that is to say the advantage of using nothing but digital components for the entire transmission system, including bringing together the individual channels at the transmitting side and splitting them again at the receiving side — is achieved, however, neither by the known method first mentioned nor by the known method last mentioned; for in the known method first mentioned, the items of equipment already referred to for taking and for maintaining constancy are needed, as analogue components for every channel, on both the transmitting and the receiving side; and in the known method last mentioned, the low-pass filters already referred to are needed, likewise for every channel, on both the transmitting and the receiving side. The fundamental reason why this advantage, theoretically obtainable by the use of orthonormal functions as carrier signals, has hitherto not been achieved either by the two known methods described or by any other method of the type referred to in the preamble, is that the train of thought behind all known methods of transmission whereby orthonormally related time functions are used as carrier signals has remained tied to long-standing carrier-frequency techniques. In all these known methods of transmission, that is to say, the carrier signals are still treated as in long-standing carrier-frequency technique; in other words, they are always maintained as in long-standing carrier-frequency technique and the units of information to be conveyed by the individual carrier-frequency signals are "modulated on to" the carrier signals. This modulation on to the everpresent carrier signals, in all these known transmission methods using orthonormal time functions as carrier signals, can be readily seen from the fact that they provide, on the transmitting side, for the use of a multiplier — or, in the parlance of carrier-frequency technology, a ring modulator — for every channel. This mode of treatment of the carrier signals is itself based on the preconception, taken over by the world of technology from long-standing carrier-frequency practice, that the carrier signals conveying units of information must be constantly maintained. This preconception, however, goes back to the time of the first spark transmissions with Tesla waves — that is to say of wireless telegraphy by spark discharge across a gap forming part of an oscillatory circuit, from which the term "spark transmission" arose, — and it has indeed every justification in analogue technique, in which one works with oscillatory circuits of finite bandwidth and any switch-off of carrier signals results in relatively long build-up and decay times in the oscillatory circuit, which cannot be usefully employed for information transmission. When orthonormal time functions are used as carrier signals, however, this preconception no longer holds good, for the reason that the "build-up time," for example, of a Walsh function must by definition be materially shorter than the time division of such Walsh functions and hence negligible in relation to the Walsh function cycle. In other words, when orthonormal functions are used as carrier signals, the carrier signal is available in full at the instant of switch-on.

The basic aim of the invention is thus to find a method of transmission of the type referred to in the preamble, such that the advantage already mentioned — the possibility of constructing the transmission system operating by that method from digital components along — can be obtained in practice.

According to the invention, this is achieved, in the case of a method of the type described in the preamble, by virtue of the fact that the units of information in each of the $n$ signal channels are supplied in binary form, the duration of a one-bit unit of information being made the same for all these binary units of information supplied over the $n$ signal channels, that the cycle duration T of the time functions $F_1(t)$ to $F_n(t)$ used as carrier signals is made equal to the said duration of one bit of the binary units of information, and that the individual bits of binary units of information supplied over any $m^{th.}$ signal channel are transmitted, according to the binary decision contained in the bit, by applying or not applying to the common signal path the carrier signal associated with the $m^{th.}$ signal channel, for a complete carrier-signal cycle in every instance, over the common signal path, and are directly regained, after transmission, as an integration result, from the integral $$\frac{1}{T}\int_{t_o+kT+\Delta t_m}^{t_o+(k+1)T+\Delta t_m} S(t-\Delta t_m)\cdot F_m(t-\Delta t_m)\,dt$$

One particularly advantageous form of this method is characterised by the fact that for the transmission of information from several different transmission points to a common reception point, the common signal path from the reception point is routed through each of the transmission points, a separate sender being provided at each of the transmission points and a central receiver at the common reception point; that in the central receiver, for filtering out the units of information allotted to the individual channels from the summation signal arriving at the reception point, $n$ period-synchronised time functions $F_1$ to $F_n$ are generated and, for synchronising the carrier signals contained in the summation signal arriving at the reception point with those time functions, synchronisation signals are generated, which are passed to the receiver and the various senders and with the aid of which the start of the cycle of the time functions $F_1$ to $F_n$ is determined in the receiver and the start of the cycle of the carrier signals to be applied to the common signal path in each particular sender is determined in that sender, in such a way that the carrier signals, after their transmission from the sender concerned to the central receiver, which involves a certain transmission time, are at least approximately period-synchronised at the reception point with the time functions $F_1$ to $F_n$ generated in the receiver.

The invention also relates to the application of the method in question, in the particularly advantageous form just referred to, to the automatic monitoring, from a central point, of a number of measuring points situated in different locations, one of the senders being installed at each of the measuring points and the receiver being installed at the central point, while the values measured at each of the measuring points are transmitted to the receiver by the sender associated with each particular measuring point. This application offers great advantage in cable monitoring and in particular for monitoring a high-tension cable for temperature by temperature sensing and for leakages by the detection of any leak of cable oil and the detection of penetration of the cable by water.

Futher advantageous practical forms of the invention and further developments of the said method within the scope of the invention described in the foregoing will become apparent from the subsidiary claims, to which reference is made in order to avoid repetition.

The invention is explained in detail hereunder with the aid of an example of a device for putting the method here proposed into practice, in conjunction with the accompanying drawings, in which.

Figure 1:
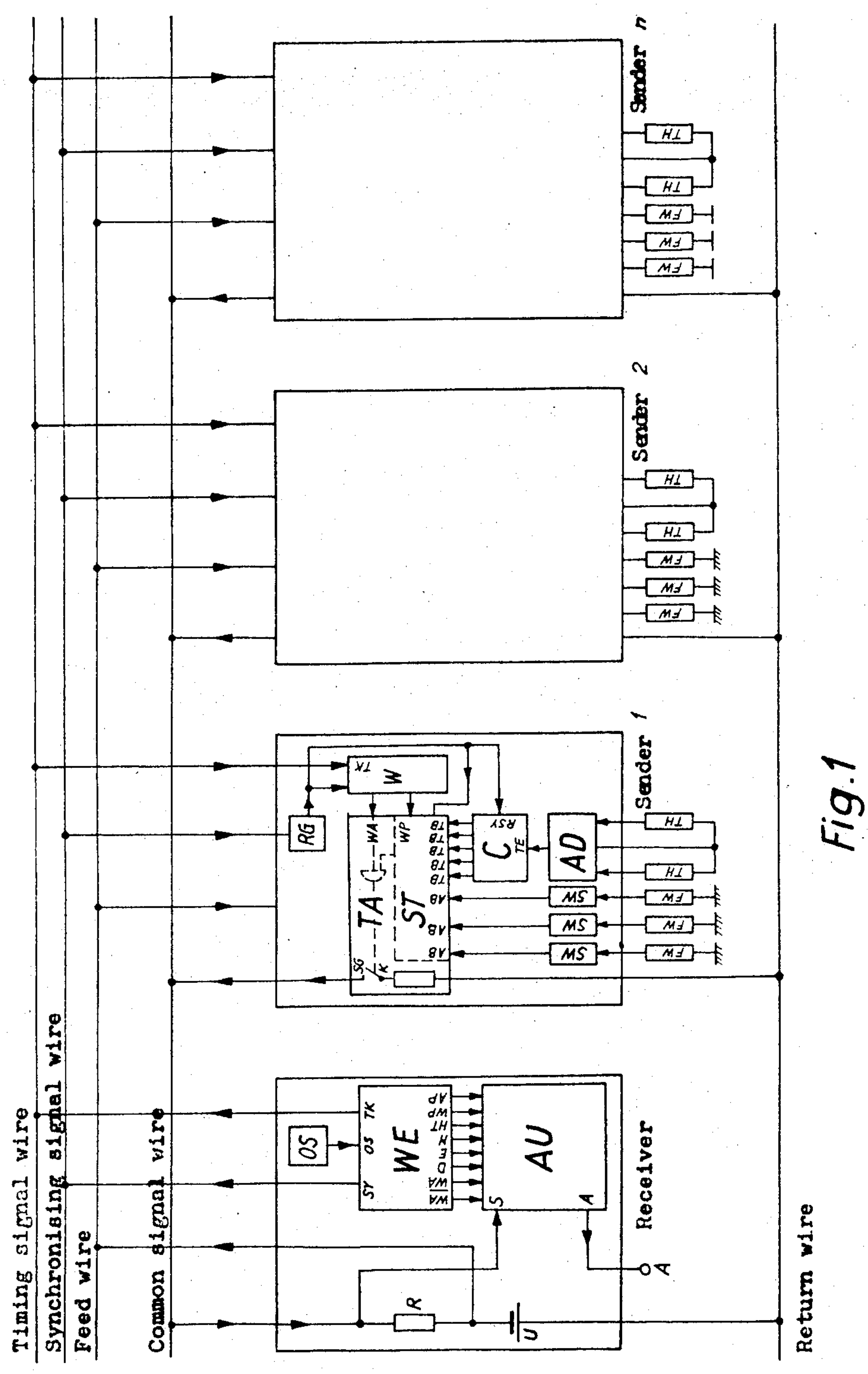
FIG. 1 is a block diagram of a device for applying the proposed method, in the form of a cable monitoring system with a central receiver and $n$ separate senders, 1 to $n$, connected to the receiver by a common signal wire.
Figure 8:
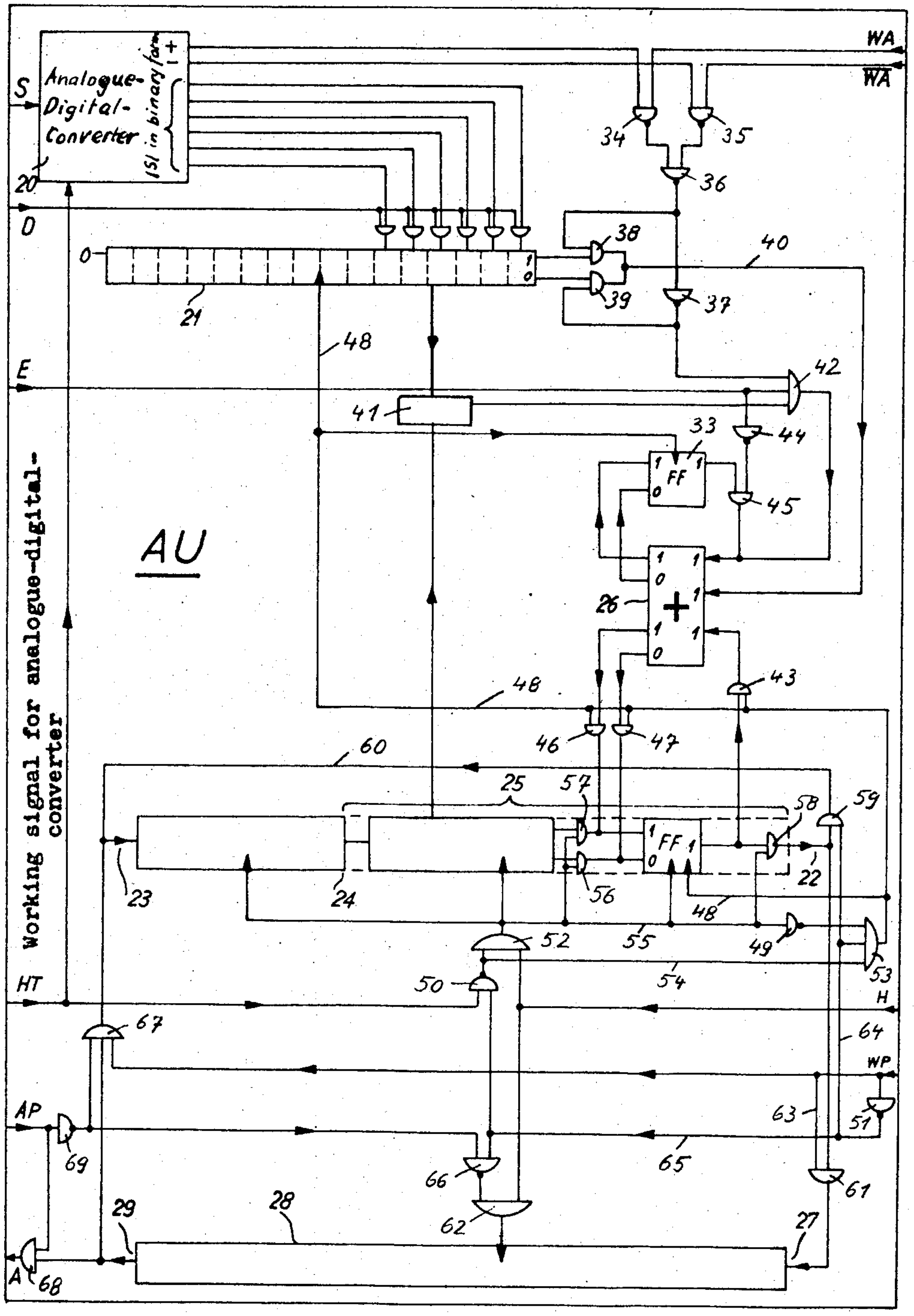
Figure 10:
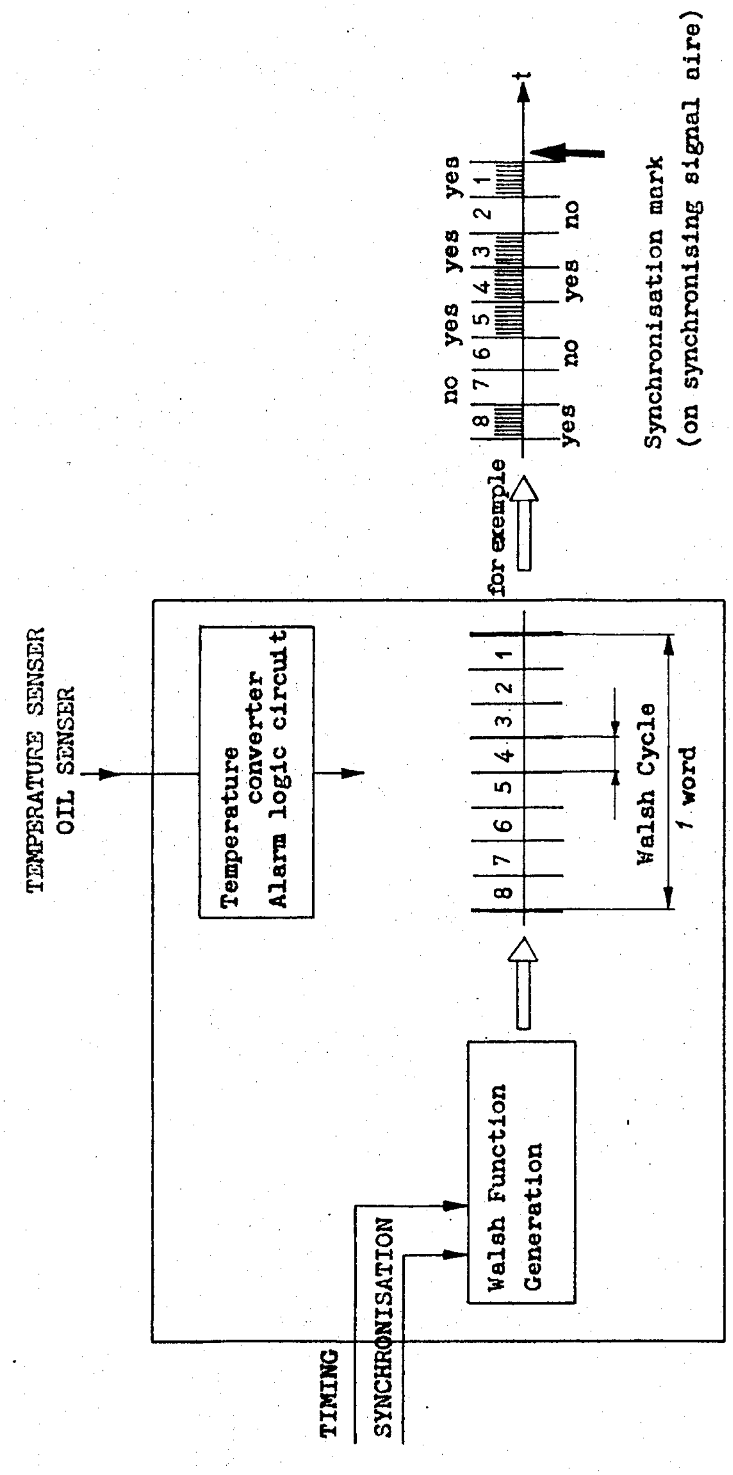
Figure 11:
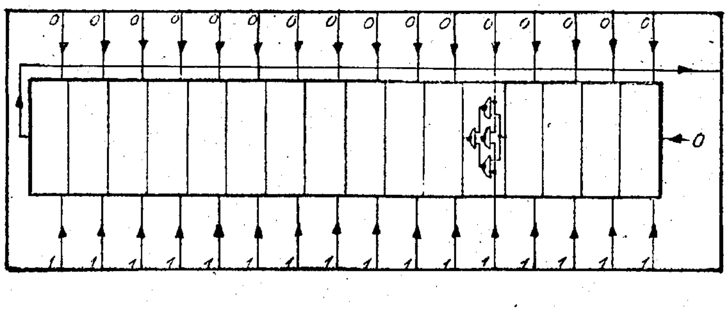
Figure 9:
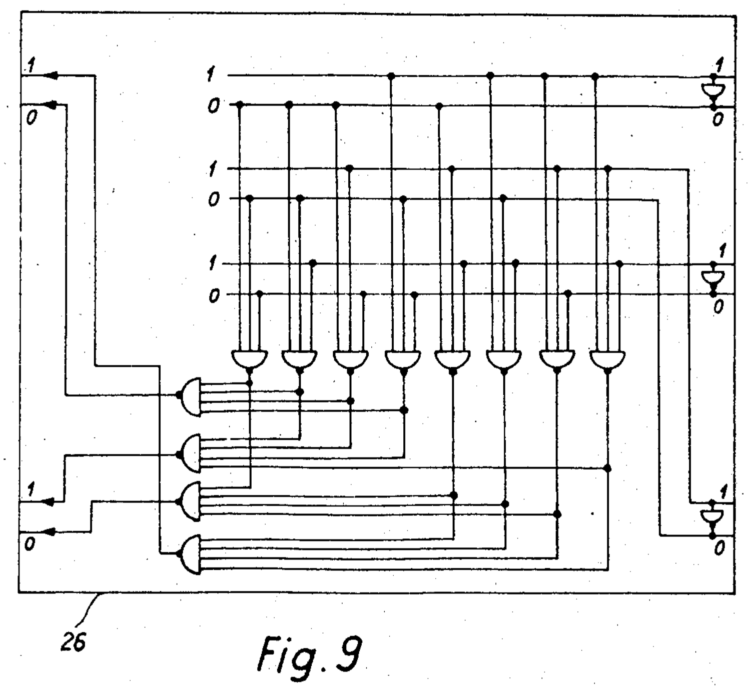
Figure 12:
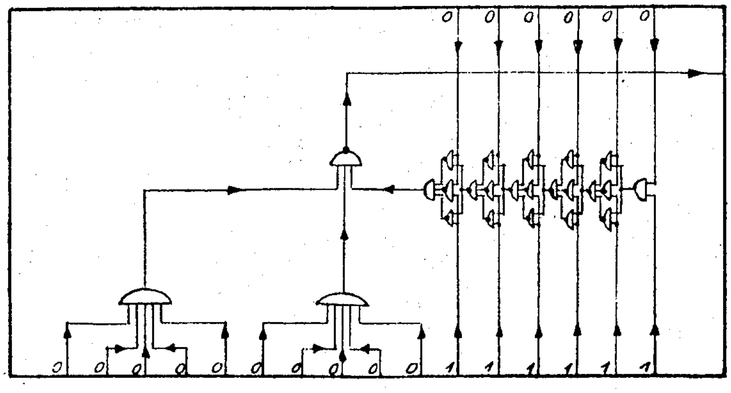

FIG. 8 is a block circuit diagram of the internal construction of the evaluator AU contained in FIG. 1, to the input side of which the summation signal arriving over the common signal wire is fed and which on the output side, at output A, delivers in serial form the integration results of the units of information transmitted by the individual senders *l* to *n* correlated over an evaluation period comprising 32 words, the first information unit or first bit of the correlated words being delivered initially by all *n* senders, then the second bit of the correlated words is delivered by all *n* senders, and so on;

FIG. 9 is a block circuit diagram of the adding equipment in the evaluator AU shown in FIG. 8 and marked there "+," the block being in the same position as in FIG. 8;

FIG. 10 is a diagrammatic representation of the mode of operation of a sender, that is to say the application or non-application to the common signal path of one complete Walsh period at a time, for the transmission of one bit or unit of information at a time; and FIGS. 11 and 12 are two possible block circuit diagrams of the carry over logic circuit 41 shown in FIG. 8 in the same position as in FIG. 8.

The cable monitoring installation shown in the block diagram in FIG. 1 works in accordance with the particularly advantageous form of the method here proposed, to which reference has been made.

One of the senders *l* to *n* is installed at each of a number of measuring points along a high-tension cable. In the practical example illustrated in the drawings, the measuring points or the *n* senders may number up to 56.

Each sender has a temperature senser consisting of two thermistors TH , with which the temperature of the H.T. cable at the measuring point associated with the particular sender is measured, as well as three oil sensers with senser resistors FW , which serve to detect any leakage of cable oil from the H.T. cable at the measuring point associated with the particular sender and at two points in the immediate vicinity of that measuring point.

Figure 3:
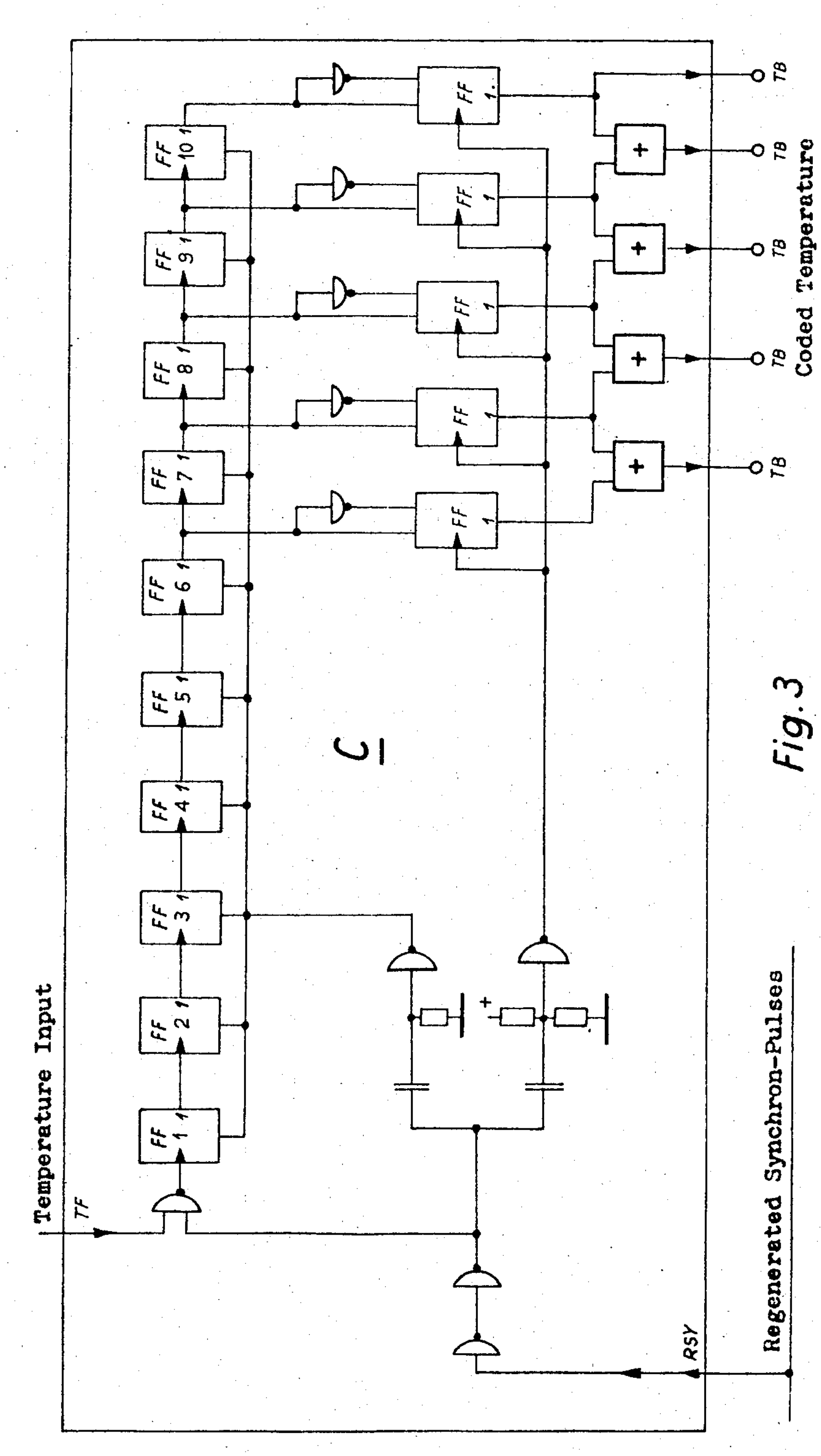
FIG. 3 is a block circuit diagram of the internal construction of the coders C contained in the individual senders $l$ to $n$ in FIG. 1, for code conversion of the serial digital values supplied by the associated analogue/-digital converter AD into a Gray code.
Figures 4, 5, 6:
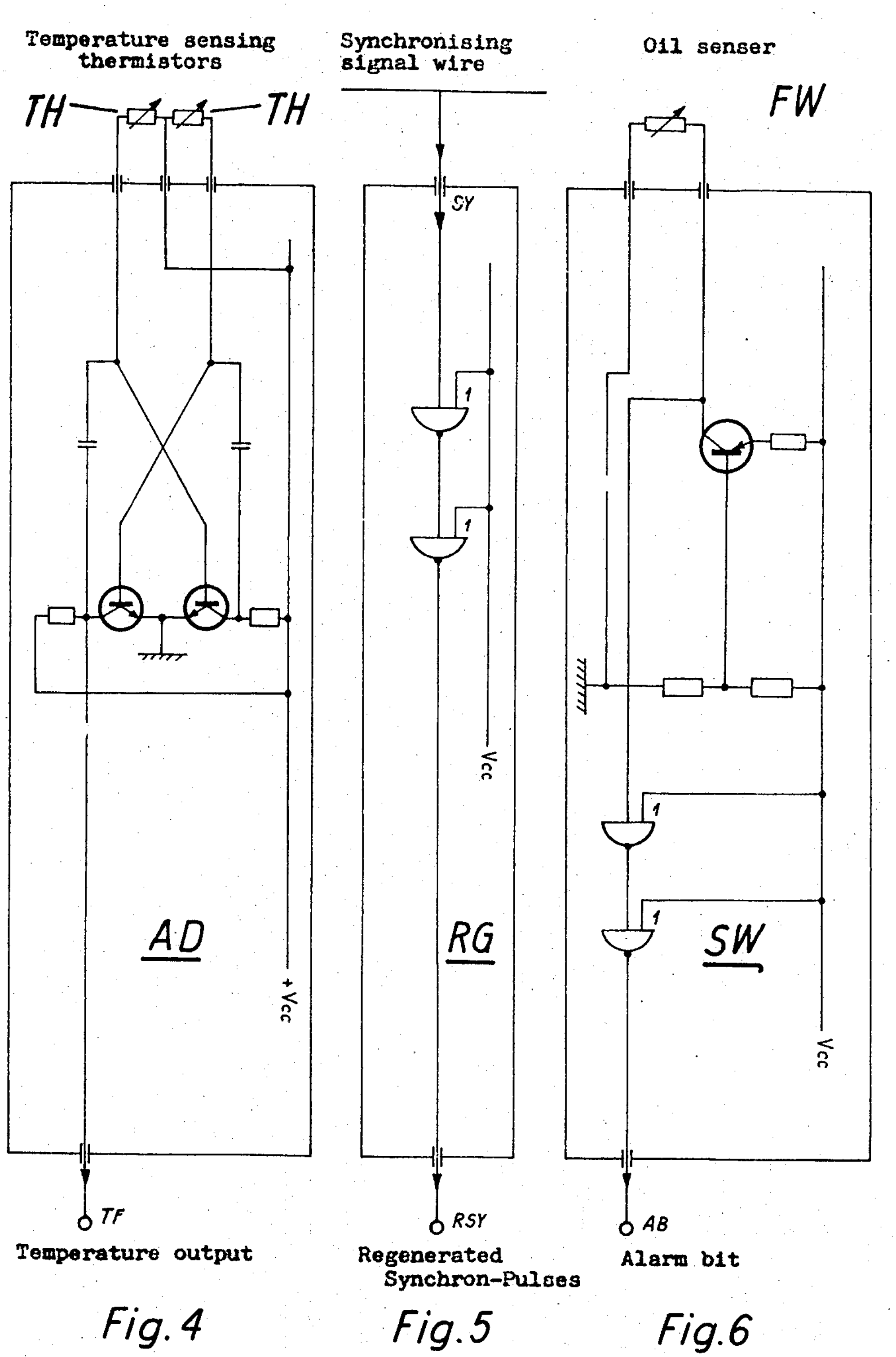
FIG. 4 is a switching layout of the analogue/digital converters AD contained in the individual sensers $l$ to $n$ in FIG. 1, for converting the analogue values supplied by the thermistors TH serving as temperature sensers into serial digital values.
FIG. 5 is a block circuit diagram of the regenerators RG contained in the individual senders $l$ to $n$ in FIG. 1, for regenerating the synchronising pulses supplied over the synchronisation signal wire.
FIG. 6 is a diagram of the internal construction of the threshold-value circuits SW contained in the individual senders $l$ to $n$, for emitting an alarm signal as soon as the resistor FW serving as senser exceeds a given threshold value.

The temperature is measured by the thermistors TH by virtue of the fact that the resistances of the thermistors TH adjust themselves according to the temperature at the measuring point and thus affect the oscillation frequency of the astable multivibrator shown in FIG. 4. The astable multivibrator shown in FIG. 4, the oscillation frequency of which is determined by the resistances of the thermistors TH , thus constitutes the analogue/digital converter AD , by which the temperature at the measuring point, which forms the analogue value, is converted into a series of pulses per unit time, which constitutes the digital value. The serial digital value of the measured temperature is delivered at the output TF of the analogue/digital converter AD in FIG. 4, that is to say to the input TF of the coder C in FIG. 3. In the coder C, the serial digital value of the temperature is passed to the 10-stage binary counter consisting of flip-flops 1 to 10, in which it is first converted from a serial digital value into a digital value coded in natural binary code. The 10-stage binary counter is cleared at every synchronising pulse arriving via the input line RSY of the coder C and accordingly always counts the number of pulses arising at the input TF between two sync. pulses. Only the highest five binary positions in the count are taken account of; these, upon the arrival of a sync. pulse via the line RSY, are stored in five flip-flops that have their inputs connected to the outputs of the highest five binary positions in the 10-stage counter, remaining there until the next sync. pulse arrives. Joined to the outputs of these five flip-flop stores are Exclusive-Or.gates, with which the Gray coding is carried out. Thus the temperature digital values in natural binary code held in the flip-flop stores are converted into temperature digital values in a Gray code. At the outputs TB of the coder C, therefore, the temperature of the H.T. cable, measured by means of the thermistors TH at the measuring point concerned during the previous sync. pulse period, arises in the form of a digital value expressed in a Gray code.

Leakage of cable oil from the H.T. cable is detected as stated by means of the senser resistors FW , by virtue of the fact that the resistance values of the senser resistors FW increase when these resistors FW come into contact with oil. For these senser resistors FW , use may be made, for example, of plastics foil consisting of polyisobutylene of high molecular weight charged with graphite. In this connection, reference is made to the Swiss patent application No. 14438/71, filed by the present applicant on the 4/10/71.

Each of these senser resistors FW is connected to a threshold-value circuit SW , shown in FIG. 6. Any increase in resistance in the senser resistor FW , indicating a leak of cable oil from the H.T. cable in the vicinity of the attachment of the senser resistor FW to the cable, raises the voltage in the resistor FW , to which a substantially constant current is fed by the transistor shown in the threshold-value circuit in FIG. 6. As soon as the voltage at the resistor FW exceeds a given threshold value, the input value of the NAND gate connected to the resistor FW changes from 0 to 1, and since there is always a 1 on the other input of that NAND gate, the output of that NAND gate changes from 1 to 0 and then the output of the second NAND gate in series with that NAND gate changes from 0 to 1. Thus, at the outputs AB of the threshold-value circuits SW , there is normally the binary number 0 when no leak is present in the H.T. cable and the senser resistances FW are accordingly low; but as soon as a leak occurs, so that the senser resistance FW in the vicinity of the leak rises and the voltage on that resistor FW exceeds the said threshold value, the binary number 1 arises at the output AB of the threshold-value circuit SW associated with that senser resistor FW.

At the control inputs TB and AB of the word-forming control unit ST contained in the testing device TA in one of the senders in FIG. 1, there are thus at any one time 8 binary units of information in all, namely the cable temperature in Gray code at control inputs TB and either the binary number 0 (normally) or the binary number 1 (in case of alarm, i.e. a cable oil leak) at each of the control inputs AB. One or two of the alarm bits can obviously also be used for other purposes, such as raising an alarm if water should penetrate the cable.

The control unit ST contained in the testing unit TA ensures that these 8 binary units of information at its control inputs AB and TB are fed in sequence (in FIG. 2, from right to left) by the sender containing the testing unit in question, at the rate of one unit of information in each cycle of the Walsh functions produced by the Walsh function generator W connected to the testing unit TA . To that end, at the start of every fresh Walsh cycle, the control unit ST receives from the Walsh function generator W via the input WP a switching pulse, by which the three-stage counter in the control unit ST is stepped forward. Joined in the usual manner to the outputs of the individual stages in this 3-stage counter is a through-switching logic circuit consisting of NAND gates, which selects one at a time of the 8 binary units of information at the control inputs AB and TB (namely whichever is at the control input AB or TB associated with the count of the 3-stage counter at the time) and passes it on to the output of one of the NAND gates 11 and 12. When, at the expiration of 8 Walsh cycles, all 8 of the binary units of information at control inputs AB and TB have been tested and sent, the 3-stage counter is set to zero by the sync. pulse fed to the control unit ST via the input connection RSY and thus synchronised. Simultaneously with the synchronisation of this 3-stage counter, the sync. pulse also synchronises the Walsh function generator W , so that this begins a fresh Walsh cycle simultaneously with the restoration of the 3-stage counter to zero. Thereupon all 8 of the units of information at control inputs AB and TB are again tested by the control unit ST , and then comes another sync. pulse, so that between every two sync. pulses all 8 units of information are tested and sent. Since the coder C, as already explained, likewise between every two sync. pulses, that is to say per sync. pulse cycle, determines a fresh temperature value, which is then available at the control inputs TB of the control unit ST during the particular sync. pulse cycle that follows, this means that in every fresh sync. pulse cycle a freshly determined temperature value is sent, in addition to the test response of the alarm bits arising at the control inputs AB , which amounts in every sync. pulse cycle to a fresh word made up to 8 binary units of information, 5 bits of which indicate the newly determined temperature value, the remaining 3 being alarm bits. Since each of these "words" coincides with a fresh sync. pulse cycle, the result is thus "word by word" synchronisation; and as the sync. pulses are supplied via the sync. pulse regenerator RG shown in FIG. 5, which consists of two NAND gates joined in series, and via the synchronising signal wire from the central receiver, which can be seen in FIG. 1, the start of the word in all of the senders *l* to *n* is also necessarily synchronised at the same instant in each case (subject, of course, to the times taken by the sync. signals supplied by the receiver over the synchronising signal wire to the various senders *l* to *n* being negligibly small). To give a clearer picture of the delivery and emission of the information supplied by the temperature senser and oil senser in the form of words of 8 binary units of information each, as well as of the synchronisation taking place after every word, this is further shown in diagrammatic form in FIG. 10.

Figure 2:
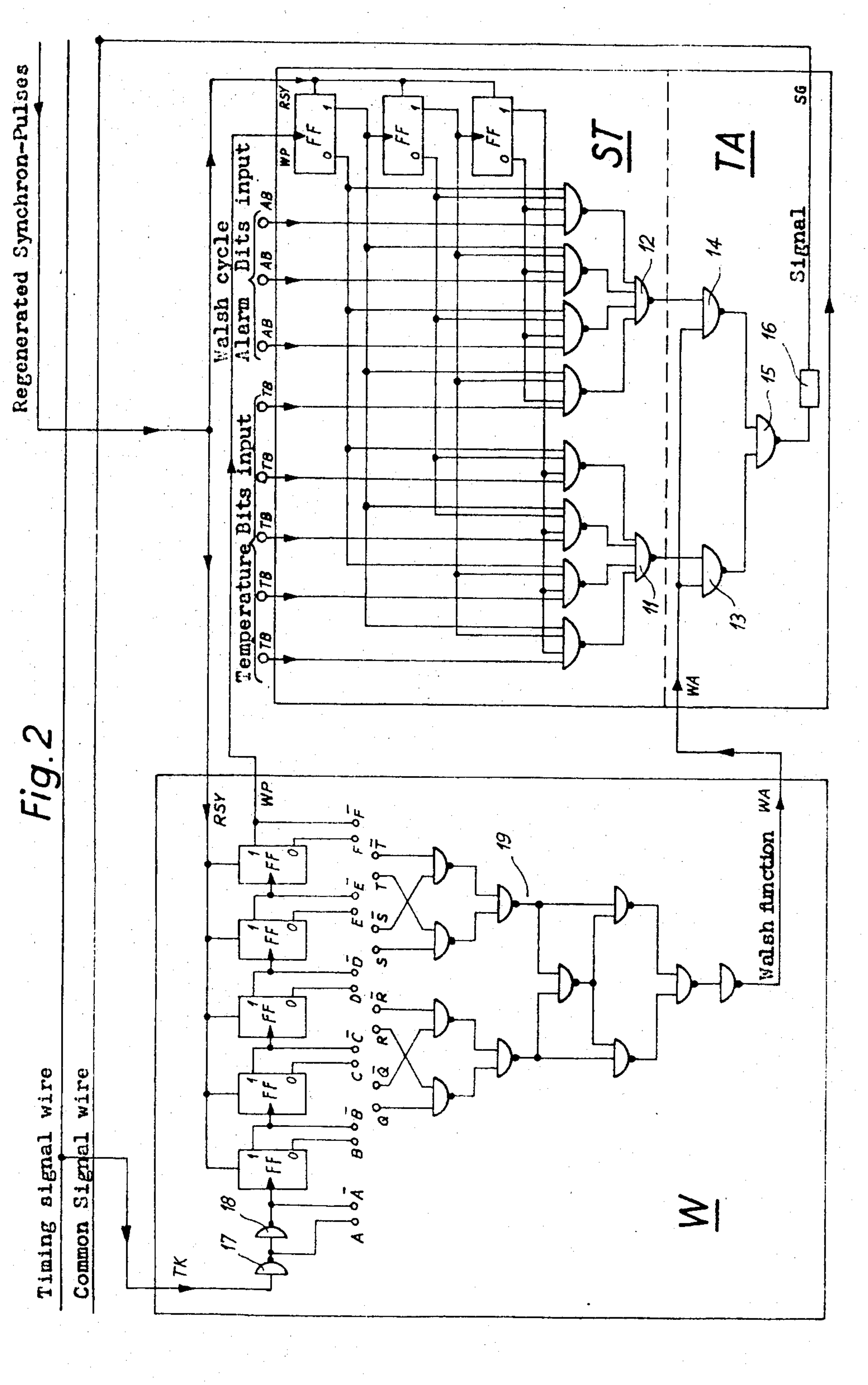
FIG. 2 is a block circuit diagram of the internal construction of the Walsh function generators W contained in the individual senders $l$ to $n$ and of the test units TA, likewise contained in those senders, each of which includes a wordforming control unit, ST, for applying or not applying the Walsh function generated in the sender to the common signal wire.

As stated above, the control unit ST in the test unit TA passes each tested binary unit of information in turn to the output of one of the two NAND gates, 11 and 12 in FIG. 2. In this connection, it should be mentioned that in every case the binary number arising at the output of whichever of the two NAND gates 11 and 12 does not receive the binary unit of information is 0, while at whichever of the NAND gates 11 and 12 does receive the binary unit of information the binary number arising depends on the binary unit of information, being 1 if the unit of information is 1 and 0 if the unit of information is 0. As can be seen from FIG. 2, each of the outputs of these two NAND gates 11 and 12 is connected to an input of one of the two NAND gates 13 and 14, while the other two inputs of these are joined in parallel and to them is applied the Walsh function produced by the Walsh function generator W and fed to the test unit TA over the input connection WA . Now if the binary unit of information arising at the output of one of the two NAND gates 11 and 12 has the binary value 0, a 0 arises at the inputs of both the NAND gates 13 and 14 and a 1 arises accordingly at their outputs, so that the binary value at the output of the NAND gate 15, to the inputs of which the outputs of the NAND gates 13 and 14 are connected, is 0, which means that the final-stage transistor of the NAND gate 15, which is in the form of a "NAND gate with open collector," is blocked. In FIG. 1, this final-stage transistor of the NAND gate 15 is represented symbolically by the switch K . Thus, when the binary unit of information at the output of either of the NAND gates 11 or 12 or the binary unit of information just tested by the control unit ST is 0, the switch K in FIG. 1 remains open throughout the Walsh cycle during which that binary unit of information is tested or stands at the output of either of the two NAND gates 11 and 12. If, on the contrary, the binary unit of information at the output of one of the two NAND gates 11 and 12 has the binary value 1, a 0 will arise at the input of only one of the NAND gates 13 and 14 and accordingly a 1 will arise at the output of that NAND gate, whereas, in the case of the other NAND gate 13 or 14, there will be a 1 at one input and the Walsh function at the other. Now if the instantaneous value of the Walsh function be equivalent to the binary value 1, a 0 will arise at the output of that NAND gate 13 or 14 and hence a 1 at the output of the NAND gate 15, which means that in this case the final-stage transistor in the NAND gate 15 (i.e. the switch K in FIG. 1) will stand open; and if the instantaneous value of the Walsh function be equivalent to the binary value 0, a 1 will arise at the output of the said NAND gate 13 or 14 and hence (there being a 1, in fact, at the output of the other NAND gate 14 or 13, as stated) a 0 at the output of the NAND gate 15, which means that in this case the final-stage transistor in the NAND gate 15 will be blocked or the switch K in FIG. 1 opened. If, therefore, the binary unit of information at the output of one of the two NAND gates 11 and 12 or the binary unit of information just tested by the control unit ST is equal to 1, the switch K in FIG. 1 will be opened and closed according to the function variation of the Walsh function produced by the Walsh function generator W , again throughout the entire Walsh cycle during which that binary unit of information is tested or stands at the output of one of the two NAND gates 11 and 12.

In FIG. 1, this mode of operation of the test unit TA is indicated symbolically as being that the Walsh function passed to the test unit TA via the input connection WA from the Walsh function generator W operates the switch K , switching it on or off according to its function value, while the control unit, should the unit of information tested by it be a 1, establishes the necessary connection for operation between the Walsh function and the switch K and, should the unit of information tested by it be a 0, breaks the operational connection between the Walsh function and the switch K .

In this connection, it should also be pointed out that the said final-stage transistor in the NAND gate 15 symbolised by the switch K in FIG. 1 does in fact act only as an electronic switch and hence that no send current from the various senders $l$ to $n$ is applied to the common signal path, only the resistor in series with the switch K in FIG. 1 (which corresponds to the resistor 16 in FIG. 2) being connected to the common signal wire or switched in parallel with the two leads "common signal wire" and "return wire." The closing of the switch K causes current to flow through this resistor, energised by the voltage source U contained in the receiver in FIG. 1. This current in turn gives rise to a voltage drop, proportional to the current, in the resistor R in the receiver, which can be treated as the signal of the particular sender in which the switch K has been closed. So that each individual sender may produce the same voltage drop at the resistor R in the receiver when the switch K is closed, the resistances in each sender must be reduced by the ohmic line resistance of the common signal wire and return wire between the receiver and the sender concerned, related to a nominal resistance value, the same for all senders, such as would arise for those resistors, given negligibly low line resistance. This nominal resistance value must be higher than the line resistance of the common signal wire and the return wire between the receiver and that sender which is most distant along the signal wire. Moreover, in order that the voltage drop at the resistor R in the receiver shall always be the same when the switch K in one of the senders is closed, irrespective of the number of other senders in which the switch K happens to be closed, the resistance R in the receiver should preferably have a considerably lower rating than the said nominal resistance value — preferably lower than the nominal resistance value divided by the number of senders or by the number $n$ of signal channels. Allowing for a maximum tolerance of $x$ per cent. in the said voltage drop at the resistor R and designating the said nominal resistance value $W_{nom}$, the rating of the resistor R should be $x/100n \cdot W_{nom}$. The resistor R may well be smaller than or equal to $1/5nW_{nom}$; that certainly gives a maximum tolerance of 20 percent for the said voltage drop at R , but such would arise only if the switches K in all the senders chanced to be closed simultaneously, which is extremely improbable, and on average such a rating as $R = 1/5nW_{nom}$ would give a tolerance of only about 5 percent for the said voltage drop.

Since, then, no send current is applied to the common signal wire by the individual senders $l$ to $n$, but the transmission or signalling power for the signals transmitted from the senders to the receiver comes from the voltage source in the receiver, all that needs to be fed to the individual senders over the feed wire shown in FIG. 1 is such power as is required for operating the switch K or for internal consumption in the individual senders. This offers considerable advantages when $n$ , the number of transmitters, is large, because the load on the feed wire is then greatly relieved.

The Walsh function controlling the switch K in FIG. 1 and the NAND gates 13 and 14 in FIG. 2 is generated in the Walsh function generator W in the sender from the time pulses fed to the receiver, as can be seen from FIG. 2. These time pulses, fed to the Walsh function generator W via the input connection TK , are first regenerated by means of two NAND gates, 17 and 18, joined in series as inverters, being changed back, that is to say, into square pulses (since the time pulses generally tend to lose their squareness to some extent in the timing wire, during transmission from the receiver to the individual senders), and are then passed to a 5-stage binary counter. At the input to this 5-stage binary counter and the outputs from its various count stages, the Rademacher functions and the corresponding complementary functions appear and are passed to the terminals B, C, D, E and F and $\bar{A}$, $\bar{B}$, $\bar{C}$, $\bar{D}$, $\bar{E}$ and $\bar{F}$. The Rademacher function complementary to the Rademacher function at the input of the 5-stage binary counter is picked up from between the two NAND gates 17 and 18, as seen in FIG. 2, and passed to the terminal A. From these Rademacher functions and their complementary functions, available at the terminals A, $\bar{A}$ to F, $\bar{F}$, the Walsh functions can be produced by conventional means with the aid of a logic circuit, which carries out the binary addition of the binary function values of the Rademacher functions at all the inputs to that circuit in the zero binary position, i.e. without carry-over, and produces the result of addition in binary form. In all, there are six consecutive Rademacher functions and their complementary functions at the terminals A, $\bar{A}$ to F, $\bar{F}$, and from these, by means of the logic circuit 19, which consists of NAND gates, a total of 50 different Walsh functions can be produced, and a further 6 Walsh functions differing from those Walsh functions can be derived directly from the terminals A to F or the complementary outputs $\bar{A}$ to $\bar{F}$. One of these 50 to 56 Walsh functions is allotted to each individual sender and then the appropriate connections are established between the inputs Q, $\bar{Q}$; R, $\bar{R}$; S, $\bar{S}$; and T, $\bar{T}$ of the logic circuit 19 and the terminals A, $\bar{A}$ to F, $\bar{F}$, in each case 1, 2, 3 or 4 of the input pairs, Q, $\bar{Q}$ to T, $\bar{T}$ being joined to a corresponding number of terminal pairs A, $\bar{A}$ to F, $\bar{F}$ — for example, Q to A, $\bar{Q}$ to $\bar{A}$, R to B, $\bar{R}$ to $\bar{B}$, S to C, $\bar{S}$ to $\bar{C}$, T to D and $\bar{T}$ to $\bar{D}$. In case, only 1, 2 or 3 of the four input pairs Q, $\bar{Q}$ to T, $\bar{T}$ are joined to a corresponding number of terminal pairs A, $\bar{A}$ to F, $\bar{F}$ — for example Q to B and $\bar{Q}$ to $\bar{B}$ — then the binary value 0 is to be supplied stationary to the complementary inputs — thus in the said example to the inputs $\bar{R}$, $\bar{S}$ and $\bar{T}$ — and the binary value 1 is to be supplied stationary to the normal inputs — thus in the said example to the inputs R, S and T — of those input pairs not being joined to the terminal pairs. The programming of the senders described above is carried out before the senders are put into service.

The "programmed" Walsh functions are then produced the whole time when in service. The 5-stage binary counter already mentioned, in the Walsh function generator W, is set to zero by the Walsh function generator, by pulses fed to the input connection RSY, to initiate a fresh Walsh cycle. From the output connection WP, the Walsh function generator W emits the switching pulse already referred to, at the start of every Walsh cycle, to the control unit ST. From the output connection WA, the Walsh function generator W passes to the test unit TA the Walsh function it has produced from the timing pulses received by it via the input connection TK.

Regarding the Walsh function generator, it should be stated, in point of fact, that this does not actually generate true Walsh functions, but rather Walsh functions overlaid by a constant base voltage. This base voltage is equal to one-half of the voltage representing the binary value 1. However, this does not affect the operation of the senders in any way, since the Walsh functions produced in the senders operate only the NAND gates 13 and 14, for which it is immaterial whether the Walsh functions operating them are delivered as 1 and-1 or as 1 and 0, because -1 closes them just as well as 0. The same or similar considerations also apply to the signal currents in the common signal wire resulting from the opening and closing of the switch K in FIG. 1. All these signal currents are naturally unidirectional, all being caused to flow by the voltage source U in the receiver. It can be shown, however, that this in no way affects proper transmission of the signals or proper splitting of the individual channels or of the items of information delivered in the receiver from the individual senders, basically because the Walsh function of order zero has a function value that does not vary with time and is thus a constant magnitude, and all Walsh functions, from order zero to as high an order as desired, can be superimposed and then separated again by synchronous correlation. Hence, a constant basic current level (corresponding to the temporal mean value of all the signal currents arising from the individual senders) impressed on the Walsh functions in the common signal wire, has no effect on the splitting of the individual channels in the receiver.

The signal currents produced by the individual senders through the closing and opening of the switches K contained in them become superimposed in the common signal wire to form a summation current, which constitutes the summation current already mentioned as being transmitted over the common signal wire. This summation current produces at the resistor R in the receiver a voltage proportional to the summation current, which is fed to the input S of the evaluator AU in the receiver, shown in FIG. 8. Within this evaluation AU, the said voltage proportional to the summation current is first passed to the analogue/digital coverter 20, from which that voltage reappears in digital form, that is to say in the form of a 6-figure binary number proportional to that voltage reduced by its temporal mean value. The equivalent of the voltage drop ΔU resulting from the signal current of a sender, at the resistor R in the receiver, is 2 units of the digitalised voltage. The temporal mean value of the voltage is, for example, in the case of 56 senders, equal to 28ΔU or 56 units or, in general terms, equal to $n/2$ΔU or $n$ units when there are $n$ senders. Thus, if the voltage fed to the analogue/digital converter be equal to 10ΔU, there being 56 senders, the analogue/digital converter will deliver 20–56 = –36 units, the value 36 arising at the outputs for the amount of S and the negative sign arising at the "–" sign output. In general terms, the analogue/digital converter 20 outputs, for the value S , delivery a binary value proportional to the voltage less its temporal mean value, a binary 1 being delivered at the "+" sign output for instantaneous voltages greater than that mean value and a binary 1 being delivered at the "–" sign output for instantaneous voltages smaller than that mean value.

With this summation signal S(t) produced in binary form by the analogue/digital converter 20, to determine the integral $$\frac{1}{T}\int_{t_o+kT+\Delta t_m}^{t_o+(k+1)T+\Delta t_m} S(t-\Delta t_m)\cdot F_m(t-\Delta t_m)\,dt$$

for each one of the channels $l$ to $n$, is formed the sum corresponding to that integral and divided by $s$, $$\sum_{\xi=1}^{64} S\left(t_o+kT+\frac{\xi-\frac{1}{2}}{64}T\right)\cdot F_m\left(t_o+kT+\frac{\xi-\frac{1}{2}}{64}T\right)$$

obtained in the 64 individual time divisions of the Walsh cycle extending from the moment ($t_o$+$k$T) to the moment ($t_o$+($k$+1)T) — the transmission time $\Delta t_m$ for all channels or all senders $l$ to $n$ being assumed to be negligibly small — by multiplication of the particular value S($t_o$+$k$T+($\xi$–½/$s$)T) of the summation signal S($t$) in the $\xi^{th.}$ time division of the Walsh cycle by the particular value $F_m$($t_o$+$k$T+($\xi$–½/$s$)T) of the Walsh cycle associated with the $m^{th.}$ channel in that $\xi^{th.}$ time division.

To that end, in each individual time division of the 64 into which a Walsh cycle is divided in the present case, the summation voltage S($t$) is derived during the first half of the time division from the voltage at the input of the analogue/digital converter 20 during that period, and in the second half of the time division this summation signal S($t$) obtained during the first half of the time division and arising at the output of the analogue/digital converter 20 is then multiplied in turn by the individual function value of the Walsh functions of order zero to 63, $F_o(t)$ to $F_{63}(t)$, applicable to the time division concerned.

In the analogue/digital converter 20, for deriving the summation signal S($t$) from the voltage at the input of the analogue/digital converter 20, a voltage source, a Gratz rectifier, a converter and seven flip-flops are provided. The voltage source supplies a constant voltage of 28ΔU and is joined in series to the input of the analogue/digital converter 20 with the input voltage polarity reversed. The voltage resulting from the input voltage and this constant voltage is accordingly 28 ΔU lower than the input voltage and represents the input voltage less its temporal mean value. The Gratz rectifier (a full-wave rectifier consisting of four bridge-connected diodes) has its input joined to the series arrangement of voltage source and analogue/digital converter input and delivers at its output the resultant voltage just mentioned, i.e. the analogue/digital converter input voltage less its temporal mean value. The converter referred to, which has its input connected to the Gratz rectifier output, acts in conjunction with six of the said seven flip-flops and converts the analogue value at its input — namely the input voltage of the analogue/digital converter less its temporal mean voltage — in the ratio of two binary units to one ΔU, into a 6-figure binary number equivalent to the analogue value. This converter comprises a sawtooth generator, which supplies a voltage rising linearly from zero to 28 ΔU within a given rise time of at most one-half of a time division, a pulse generator producing 56 pulses within the said rise time, a diode and a triple-input AND gate. The sawtooth generator and the diode are joined in series and this series arrangement is connected to the converter input, the polarity of the sawtooth generator being such that its voltage is opposite in direction to the converter input voltage. The diode is connected in the blocking direction in relation to the converter input voltage. Joined across the diode is one of the three AND-gate inputs, a second of those inputs being connected to the output of the pulse generator, while the third AND-gate input is joined to the control wire HT supplying the operating signal for the analogue/digital converter. The six flip-flops already mentioned are linked together to form a counting chain, with its input connected to the AND-gate output. The converter works as follows:

As already mentioned, a voltage equal to the input voltage of the analogue/digital converter 20 less its temporal mean value is applied to the input of this converter. The sawtooth generator is started by the leading edge of the operating signal HT fed to the analogue/digital converter 20 and hence, at the start of the operating signal, generates a voltage increasing linearly from zero and opposite in direction to the analogue/binary converter input voltage. The diode, being biased in the blocking direction by the input voltage of this converter, therefore remains blocked until the sawtooth generator voltage has risen to equal the converter input voltage, when the diode is tripped and becomes conductive. For as long as the diode is blocked, it carries a bias voltage equal to the difference between the converter input voltage and the sawtooth generator voltage, and the diode voltage drop is practically nil when it trips. From the start of the oprating signal, therefore, to the moment of coincidence, when the sawtooth generator voltage equals the converter input voltage, the AND-gate input joined to the diode receives a switch-through signal. During this time, the operating signal HT, and hence likewise a switch-through signal, is applied to the said third AND-gate input. From the start of the operating signal HT to the said moment of coincidence, therefore, the AND-gate allows pulses to pass from the pulse generator, the output of which is connected to the second AND-gate input, so that the counting chain, which has its input joined to the AND-gate output, counts the pulses delivered by the pulse generator from the start of the operating signal HT to the said moment of coincidence, the pulse count being stored in binary form in the counting chain. Since, as already stated, the pulse generator emits two pulses per ΔU voltage rise in the sawtooth generator and the sawtooth generator voltage is the same as the converter input voltage at the moment of coincidence, the converter input voltage is converted in the converter, as already stated, in the ratio of two binary units to one ΔU and the resultant binary value is stored in the counting chain of six flip-flops. The outputs of the six stages in the counting chain constitute at the same time six outputs of the analogue/digital converter 20 for the value |S| of the summation signal $S(t)$ obtained in the form of a 6-figure binary number. In FIG. 8, the six outputs for the value |S| are shown to the right of theanalogue/digital converter 20. Of these six outputs, the topmost corresponds to the lowest binary position and the others, taken in succession downwards, correspond in each instance to the next-higher binary position. The other two outputs of the analogue/digital converter 20 shown in FIG. 8 and marked "+" and "−", at which the sign of the summation signal $S(t)$ is passed forward, are connected within the analogue/digital converter to the outputs of the seventh flip-flop, that is to say the "+" output to the 1 output and the "−" output to the 0 output of that flip-flop. The 1 setting input of that seventh flip-flop is connected via an AND gate to that terminal of the Gratz rectifier which, when the input voltage of the analogue/digital converter 20 lies above 28 ΔU, has positive voltage in relation to the frame connection of the two input terminals of the analogue/digital converter 20. The AND gate has two further inputs, to one of which the operating signal HT is fed, while the other is joined to the output of a NAND gate acting as an inverter, to one input of which a binary 1 is constantly applied and the other input of which is joined to the converter diode already mentioned. The AND gate becomes conductive as soon as the value |S| has been counted out by the six flip-flops forming the counting chain; and if the input voltage of the analogue/digital converter 20 is greater than 28 ΔU, so that the summation signal $S(t)$ is positive in sign, the seventh flip-flop is set to 1 as the AND gate becomes conductive, whereas it would otherwise stay at 0. The conductive state of the AND gate ceases when the operating signal HT ends. A clearing signal is also derived from the leading edge of the operating signal pulse HT and passed to all seven flip-flops in the analogue-digital converter 20, restoring them all to zero at the start of the operating signal HT. Instead of the counting pulses for the counting chain of six flip-flops being generated by the said pulse generator within the analogue/binary converter or the analogue/digital converter 20, they may equally well be supplied to the analogue/digital converter 20 from outside, over the control wire D shown in FIG. 8. Over this control wire D, 64 pulses are fed while the operating signal HT is passing. In that case, therefore, the voltage rise with time in the sawtooth generator should be made such that the voltage supplied by the sawtooth generator increases linearly from zero to 32 ΔU while the operating signal HT is passing, to preserve the ratio of two binary units per ΔU. Regarding the construction of the analogue/digital converter 20 as described above, it should be mentioned, finally, that ΔU, in the practical example chosen, was 2 volts, this level being such that it was possible to ignore the voltage drop in the diodes contained in the converter and Gratz rectifier when in the conductive state. For lower values of ΔU, the errors induced by the voltage drop in the diodes when these are conductive must be corrected, failing which the design of the analogue/digital converter 20 described above must be modified. Suitable possible modifications of the analogue/digital converter 20 will be generally apparent from the principles of data processing technology.

Thus, from the end of the first half of each individual time division until the start of the next time division, in other words throughout the entire second half of each time division, the summation signal $S(t)$ stands at the output of the analogue/digital converter 20 in the form of a 6-figure binary number equivalent to the value |S| of that signal and of the sign thereof. Then, as stated previously, during the second half of the time division, that summation signal $S(t)$ is multiplied in turn by the individual function values of the Walsh functions of order zero to 63, $F_o(t)$ to $F_{63}(t)$, applicable to the time division concerned.

Since the function values of Walsh functions can be only +1 or −1, the value of the products $S(t)\cdot F_o(t)$ . . . $S(t)\cdot F_{63}(t)$ of these multiplications is in any case equal to the value |S| of the summation signal $S(t)$ obtained for the time division in question, that is to say that the multiplications of summation signal $S(t)$ by function values $F_m(t)$ to be carried out in the second half of the time division concern only the sign of those products, which, as regards their value $|S(t)\cdot F_m(t)|$ , all correspond to the value |S|. In the summation already mentioned $$\sum_{\xi=1}^{64} S\left(t_o+kT+\frac{\xi-\frac{1}{2}}{64}T\right)\cdot F_m\left(t_o+kT+\frac{\xi-\frac{1}{2}}{64}T\right)$$

to be carried out for each individual channel $l$ to $n$ over the 64 time divisions of a Walsh cycle, the summation terms to be added to the $n$ summations to be carried out in one and the same time division are all equal in amount, i.e. equal to the value |S| ascertained in the first half of the time division concerned, and the sign of the products $S(t)\cdot F_m(t) = \pm |S|$, carried out in the second half of the time division concerned, determine whether the value |S| in each instance is to be added to or subtracted from the sum associated with the $m^{th}$ channel.

In the evaluator AU in FIG. 8, both the additions of this value S to the various summations and its subtractions therefrom are carried out in the form of binary additions, whereby the binary value of |S| in the case of an addition and the complement of the binary value of |S| in the case of a subtraction are added to the binary value representing the summation, as well as, in the lowest binary position, the carry-over from the highest binary position.

The binary additions are carried out, in genral terms, in the evaluator in FIG. 8, by means of the shift register 21, the adder 26 and the shift register 24.

In each instance, immediately before the start of such a binary addition, the binary value of |S| is put into store in parallel in the shift register 21, which has 16 binary positions and consists of a chain of 16 flip-flops, the setting inputs of the last 6 positions of the shift register 21 being connected to the |S| outputs of the analogue/digital converter 20 by means of a control pulse that enters over the control wire D directly before the start of every such addition and causes the AND gate connected to that control wire D to be switched through, so that the last 6 positions of the shift register 21 are set to the binary value of |S| applied to those outputs of the analogue/digital converter 20, the lowest binary digit being put into store in the last flip-flop of the shift register and each of the next higher binary digits in the binary value of |S| being put into store in the five flip-flops respectively next in sequence towards the input of the shift register 21. All the other 10 flip-flops in sequence towards the input of the shift register 21 stand at 0, because a 0 is fed in at the input of the shift register 21 with every shift pulse. (These other 10 flip-flops may actually be omitted, if the 0 be fed in at the input of the sixth-from-last flip-flop of the shift register 21.)

In the shift register 24, which has 64 register stages with 16 binary positions each and consists of a chain of 64 × 16 flip-flops and in which are stored the summations $\Sigma S(t)\cdot F_m(t)$ in process of formation for the channels l to n, each in the form of a 16-figure binary number filling one register stage, the 16 positions in its final register stage 25, at the start of such a binary addition, contain the binary value of the summation in process of formation for an $m^{th}$ channel, and here again, in the same way as in the shift register 21, the flip-flop 32 constituting the final position in this register stage 25 contains the lowest binary digit, while the flip-flops following in sequence towards the start of the register stage 25 contain the respective next-higher binary digits of that binary value.

Now in the event of multiplication of the summation signal $S(t)$ by the function value $F_m(t)$ of the Walsh function producing a positive sign, the binary value of |S| held in the shift register 21 is added by the adder 26 digit by digit to the binary value of the summation for the $m^{th}$ channel; and in the event of that multiplication producing a negative sign, it is the complement of the binary value of |S| which is so added. The way in which this takes place is that in each instance the binary digit held in the last flip-flop of the shift register 21 — or the complement thereof, in the case of a negative sign — is added by the adder 26 to the binary digit in the last flip-flop 32 of the register stage 25, in addition to which any carry-over stored in the flip-flop from the previous binary position — and, in the case of a negative sign, in the lowest binary position, any carry-over from the highest binary position — is added on; and from the result of this addition the binary digit falling in the same binary position is stored in the flip-flop 32 and any carry-over in the flip-flop 33, whereupon both the binary value in the shift register 21 and all 64 binary values in the shift register 24 are shifted one binary position forward, after which the same addition is made in the next binary position, until, after 16 such additions in each instance, the entire addition or subtraction of the binary value initially held in the shift register 21 to or from the binary value initially held in the last register stage 25 of the shift register 24 is complete and, because of the binary values in the shift register 24 being shifted 16 binary positions forward in conjunction with the 16 additions made, the binary value held in the penultimate stage of the shift register 24 prior to those 16 additions has moved forward into the final register stage 25.

The same process is then repeated, the binary value of |S| being put into store anew in the shift register 21, followed by the digit-by-digit addition of that binary value or the complement thereof to whatever binary value stands in the final register stage 25 of the shift register 24, until, after a total of 64 such additions, either the binary value of |S| or the complement thereof has been added to each of the 64 binary values held in the shift register 64. These 64 additions take place respectively in the second half of a time division and represent the addition already mentioned, to the n summations that are to be formed, of summation terms corresponding to the value |S| ascertained in the first half of each time division, which are equal in value.

Figure 7:
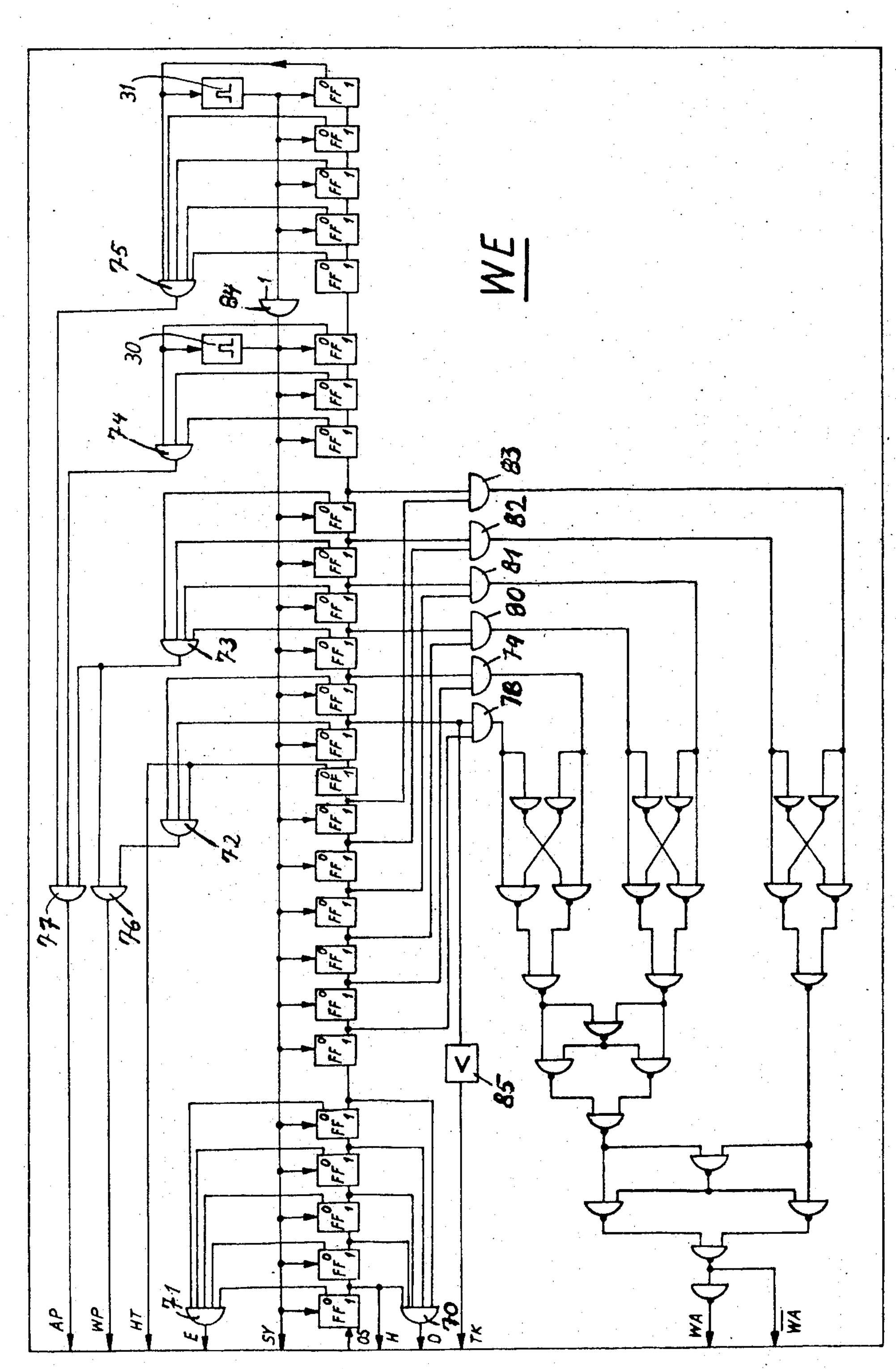
FIG. 7 is a block circuit diagram of the internal construction of the Walsh function generator WE contained in the receiver in FIG. 1, which is energised by the oscillator OS likewise contained in the receiver in FIG. 1 and supplies not only the Walsh functions, but also the synchronising pulses and timing pulses and all the control signals for the evaluator AU included likewise in FIG. 1.

To control these addition processes, the Walsh function generator WE shown in FIG. 7 supplies to the evaluator AU shown in FIG. 8 control signals over the control wires H, D, E and HT, in addition to the function values of the Walsh functions $F_0(t)$ to $F_{63}(t)$ and their complementary values over the wires WA and $\overline{WA}$; that is to say 64 × 16 pulses in each half time division over control wire H, 64 pulses in each half time division over the control wires D and E and one pulse in each time division over the control wire HT, in addition to the 64 function values of the Walsh functions $F_0(t)$ to $F_{63}(t)$ for the time division concerned during each half time division over the wire WA and, over the wire $\overline{WA}$, the complement of the function value supplied over the wire WA at the same time.

Since the control wire H is connected at the 1 output of the flip-flop producing the H pulses, the H pulses supplied over the control wire H fall in each case into the second half of their pulse cycle, the start of these pulse cycles being so defined that the start of the second half of a time division (in which the first 11 flip-flops of the counting chain in FIG. 7 stand at 0) also coincides with the start of such a pulse cycle. The D pulses supplied over the control wire D coincide, when considered from the start of the second half of a time division, with the 16th., 32nd., 48th. etc. H pulse; the 64th. D pulse in the first half of a time division lies immediately before the start of the second half of that time division, which it initiates with its trailing edge. The E pulses supplied over the control wire E, when considered from the start of the second half of a time division, fall in every case in the first half of the cycle of the 1st., 17th., 33rd. etc. H pulse; the first E pulse in the second half of a time division starts simultaneously with that second half of the time division. In general, every D pulse is followed immediately in the next H pulse half cycle by an E pulse. The HT pulses supplied over the control wire HT are each present over the entire first half of every time division. The function values supplied over the wire WA, as well as their complements supplied over the wire $\overline{WA}$, are in each case present during 16 H pulse cycles and, considered from the start of the second half of a time division, coincide with the 1st.-16th., 17th-32nd. 33rd-48th. etc. H. pulse cycle.

To explain the control of the addition processes described above by means of the control signals D, E, H and HT, one may consider the first such process in the second half of a time division. Immediately prior to the start of the second half of the time division, with the aid of the above-mentioned 64th. D pulse in the first half of that time division, the last 6 binary positions in the shift register 21 have been set to the binary value of |S| determined in the first half of the time division and standing at the |S| outputs of the analogue/digital converter 20. Thus, at the start of the second half of the time division and hence also at the start of the first addition process in the second half of the time division, the binary value of |S| stands in the shift register 21, while the binary value of the summation being formed for an $m^{th.}$ channel stands in the last stage 25 of the shift register 24. Applied to the wires WA and $\overline{WA}$, moreover, during the first 16 H pulse cycles of the second half of the time division and hence during the entire first addition process in the second half of the time division, are the function value $F_m(t)$ for the time division in question, and its complement $\overline{F_m}(t)$. The control wire HT, furthermore, carries a binary 0 during the entire second half of the time division, while the sign outputs "+" and "−" of the analogue/digital converter 20 carry the sign of the summation signal $S(t)$ determined during the first half of the time division.

Let it now be assumed, to begin with, that the function value $F_m(t)$ applying for the time division concerned to the Walsh function of order $m$ associated with the $m^{th.}$ channel is equal to +1. Then, throughout the first addition process, the wire WA will carry a binary 1 and the wire $\overline{WA}$ a binary 0. Let it also be assumed that the sign of the summation signal $S(t)$ determined in the first half of the time division concerned is negative. Then, through the second half of the time division concerned, the sign output "−" of the analogue/digital converter 20 will carry a binary 1 and the sign output "+" binary 0. In that case, the product from multiplication of the function value $F_m(t)$ by the sign of $S(t)$ will equal -1, which means that the complement of the binary value of |S|, held in shift register 21, should be added to the binary value, held in the last stage 25 of shift register 24, of the summation in process of formation for the $m^{th.}$ channel. Since, as stated, the line WA carries a binary 1 and the sign output "+" a binary 0, there is a 1 at the output of the NAND gate 34; and since the line $\overline{WA}$ carries a binary 0 and the sign output "−" a binary 1, there is likewise a 1 at the output of the NAND gate 35. There is accordingly a 0 at the output of the NAND gate 36 and a 1 at the output of the NAND gate 37, in each case from the start of the second half of the time division concerned onward throughout the first addition process. There being a 0 at the output of the NAND gate 36 and a 1 at the output of the NAND gate 37, of the two AND gates 38 and 39 connected to the 1 output and 0 output of the shift register 21, the AND gate 38 will be closed and the AND gate 39 open.

When, therefore, multiplication of $F_m(t)$ by the sign of $S(t)$ gives a negative sign, the 0 output or complement output of the shift register 21 will be connected via the AND gate 39 and wire 40 to the adder 26 and in that way the complement of the binary value of |S| stored in the shift register 21 will be added to the summation in course of formation in the register stage 25; whereas, if multiplication of $F_m(t)$ by the sign of $S(t)$ should give a positive sign, there would be a 1 at the output of the NAND gate 36 and a 0 at the output of the NAND gate 37, so that the AND gate 38 would be opened and the AND gate 39 closed, the 1 output of the shift register 21 being connected accordingly via the AND gate 38 and the wire 40 to the adder 26, so that in the case of a positive sign the binary value of |S| would be added to the summation in course of formation in the register stage 25. The retrieval of the binary value of S held in the shift register 21 through either the 1 output or the 0 output is thus equivalent to multiplication by either +1 or −1.

In the addition process considered, however, there was a negative sign and hence the complement output of the shift register 21 was connected to the adder 26. As was mentioned earlier, the last flip-flop on the output side of the shift register 21 and the last flip-flop of the register stage 25, at the time of commencement of the addition process, hold the lowest binary digits of the binary values stored therein. In the addition of the lowest digits of two binary values, there is naturally no carry-over from a previous binary position, for the simple reason that there is no binary position preceding the lowest. On the other hand, given a negative sign, as assumed for the addition process under consideration, there may be, according to what has been stated above, some carry-over from the highest binary position of the two binary values being added, to be added on in the lowest binary position. However, since the carry-over from the highest binary position at the start of the adding process, when the first step in the addition of the binary digits is carried out in the lowest binary position, is not yet available (such carry-over arising only at the last step in addition and hence at the end of the adding process), the carry-over logic circuit 41 is used to determine right at the start of the adding process whether or not there is any carry-over in the highest binary position. FIG. 11 shows a block circuit diagram of the carry-over logic circuit in the same position as that of block 41 in FIG. 8. The carry-over logic circuit consists of 16 successive stages, all identical, the internal details of one of which are shown in FIG. 11. The upper 16 inputs in FIG. 11 are joined to the 0 outputs of the 16 flip-flops in the shift register 21, while the lower 16 inputs in FIG. 11 are joined to the 1 outputs of the 16 flip-flops in the shift register 25. The output leading off to the right from the carry-over logic circuit in FIG. 11 runs to the AND gate 42 in FIG. 8. To the first stage of the carry-over logic circuit, on the far right in FIG. 11, a binary 0 is fed continuously, at the carry-over input indicated at the centre of that stage. In place of th carry-over logic circuit shown in FIG. 11, for which 64 NAND gates are needed, it is possible to use the carry-over logic circuit shown in FIG. 12, which requires only 20 NAND gates and 4 AND gates. The saving, in the carry-over logic circuit in FIG. 12, of almost two-thirds of the number of gates required for the carry-over logic circuit shown in FIG. 11 is due to the fact that the first ten flip-flops in the shift register 21, as already mentioned, always stand at 0 and can therefore always be assumed by the carry-over logic circuit to be fixed values and so need not be taken up. For that reason, the upper six inputs to the carry-over logic circuit shown in FIG. 12 are merely connected to the last six flip-flops in the shift register 21, that is to say to its 0 inputs. Of the bottom 16 inputs in the carry-over logic circuit in FIG. 12, the six marked 1 are joined to the 1 outputs of the last six flip-flops in the register stage 25 and the inputs marked 0 are joined to the 0 outputs of the first ten flip-flops in register stage 25. The output of the carry-over logic circuit leading out to the right in FIG. 12 leads to the AND gate 42 in FIG. 8. Right at the start of the addition process, then, the carry-over logic circuit 41 in FIG. 8 ascertains from the values stored at that moment in the shift register 21 and in register stage 25 whether the addition of the binary value held in rgister stage 25 and the complement of the binary value held in shift register 21 gives rise to any carry-over from the highest binary position and, if so, it feeds that carry-over, in the form of a binary 1, through the AND gate 42 to the adder 26. For that purpose, the AND gate 42 is opened, in the case of a negative sign to the product $S(t)\cdot F_m(t)$ — for only in that case need account be taken of any carry-over from the highest binary position — by the binary 1 arising at the output of the NAND gate 37 when the sign is negative and by the E pulse also passed over the control wire E during the first half of the first H pulse cycle in the adding process here considered.

During the existence of this E pulse arising in the first half of the first H pulse cycle in the second half of the time division (which E pulse is then repeated in the first half of the first H pulse cycle of each of the addition processes, each comprising 16 H pulse cycles), the first stage of the adding process here considered is carried out. For this, there are fed to the adder 26, firstly, through the AND gate 39, the complement of the binary digit held in the last flip-flop of the shift register 21 (or, in the case of a positive sign to the product $S(t)\cdot F_m(t)$, via the AND gate 38, that binary digit itself), secondly, through the AND gate 43, the binary digit held in the last flip-flop 32 of the register stage 25 and, thirdly (only in the case of a negative sign to the product $S(t)\cdot F_m(t)$), through the AND gate 42, the carry-over if any from the highest binary position.

Any carry-over in the flip-flop 33 (which would be derived from the highest binary position of the last preceding addition) is left out of account in the first stage of every addition, because, during the first stage of every addition, the control wire E carries an E pulse and accordingly there is a binary 1 at the input of the NAND gate 44 and hence a binary 0 at its output and consequently the AND gate 45, through which the output of the flip-flop 33 is connected to the carry-over input of the adder 26, is closed. During the second to 16th. step in every addition, however, that AND gate 45 is open, there being no E pulse on the control wire E during that step. During the second to 16th. step in an addition process, therefore, by way of third addened, any carry-over from the particular preceding binary position, held in the flip-flop 33, is fed in, through the AND gate 45, at the carry-over input of the adder 26.

The three values fed in, namely the two values from the shift register 21 and register stage 25 and the carry-over, if any, are added binarily in the adder 26, the internal details of which are shown in FIG. 9, and from the result of that addition the binary digits falling in the same binary position are stored, by way of the lower outputs of the adder 26, on the left in FIG. 8, and via the AND gates 46 and 47, in the flip-flop 32, while any carry-over arising from that addition are fed via the upper outputs of the adder 26, on the left in FIG. 8, to the flip-flop 33, which stores that carry-over until the next stage of addition. Thus, should all three values fed in be 0, both the flip-flops 32 and 33 will be set by the adder 26 to 0; should one of those values be 1 and the other two 0, the flip-flop 32 will be set to 1 and the flip-flop 33 to 0; should two of the values be 1 and the third 0, the flip-flop 32 will be set to 0 and the flip-flop 33 to 1; and should all three of the values fed in be 1, then the flip-flops 32 and 33 will both be set to 1.

For controlling the AND gates 43, 46 and 47, by which the flip-flop 32 is connected to the adder 26 during this stage of the addition, and for controlling all other logic operations involved in the said stage, the control pulses carried by the control wire 48 are used. These control pulses are derived from the H pulses on the control wire H by inversion with the aid of the NAND gate 49 and are thus $\overline{H}$ pulses; thus they fall in each instance in the first half of the H pulse cycles. The NAND gates 50 and 51 and the AND gates 52 and 53 attend to it that these $\overline{H}$ pulses are carried by the control wire 48 only during the second half of every time division and that the control wire 48 carries a binary 0 during the first half of every time division. In general, this is achieved by virtue of the fact that the HT pulses carried by the control wire HT alway s during the first half of the time division are inverted by the NAND gate 50, so that the control wire 54 always carries an $\overline{HT}$ pulse or binary 1 during the second half of every time division and a binary 0 during the first half of the time division, the AND gate 53, to the output of which the control wire 48 is connected, is opened only during the second half of every time division. It is true that the control wire 54 joined to the output of the NAND gate 50, for reasons to be discussed later, also carries a binary 1 during the first half time division in every Walsh cycle, because a WP pulse or a binary 1 is always fed over the control wire WP during the first half time division in a Walsh cycle, so that the output of the NAND gate 51, which otherwise always supplies a binary 1, carries a binary 0 throughout the WP pulse (resulting in a binary 1 at the output of the NAND gate 50), but the AND gate 53, to the output of which the control wire 48 is connected, will still not be opened in this case during the first half of the time division, since an additional change-of-state factor, in the form of the output from the NAND gate 51, is applied to the input of the AND gate 53, and accordingly the AND gate 53, whenever a binary 0 at the output of the NAND gate 51 gives rise to a binary 1 at the output of the NAND gate 50 and hence on the control wire 54, is held shut in fact by this binary 0 at the output of the NAND gate 51. Since the control wire 48 thus carries a binary "0" during the first half of every time division, the entire adding circuitry, with the adder 26, th flip-flop 33, the shift register 21, the analogue/digital converter 20 and the gates 34 to 39, 42, 44 and 45, as well as the carry-over logic circuit 41, is effectively separated by the AND gates 43, 46 and 47, during the first half of every time division, from the shift register 24 and all other circuit elements connected to it, and for this reason and because all the adding processes take place only in the second half of the time division, it is immaterial to the functioning of the evaluator shown in FIG. 8 what effect the signals fed to the said adding circuitry over the wires WA, $\overline{WA}$, D and E in the first half of every time division have within the adding circuitry; in other words, the blocking of the wires WA, $\overline{WA}$, D and E respectively during the first half of the time division, though all the stages of addition are carried out only in the second half of the time division, is superfluous, because of the said effective separation of the adding circuitry from the shift register 24 and the other circuit elements by the AND gates 43, 46 and 47, which are closed during the first half of every time division. (As already mntioned, the last D pulse in the first half of the time division is even necessary, for putting |S| into store in the shift register 21.)

During the second half of every time division, therefore, the control wire 48 carries the said $\bar{H}$ pulses, which are produced by the NAND gate 49 by inversion of the $\bar{H}$ pulses fed during the second half of the time division through the then open AND gate 52 and applied to the control wire 55 and are passed to the control wire 48 via the AND gate 53, which is open during the second half of the time division. The first of these pulses starts right at the beginning of the second half of the time division and its appearance causes the AND gates 43, 46 and 47 to be opened, while its trailing edge not only causes the result of addition in the first addition stage, now at the inputs of the flip-flops 32 and 33, to be put into store therein, but also results in the binary value held in the shift register 21 being shifted one binary position forward. As the $\bar{H}$ pulse or, more precisely, its trailing edge, acts as a shift pulse on the flip-flops 32 and 33 and the shift register 21, the values hitherto stored in the flip-flops 32 and 33 and in the last flip-flop in the shift register 21 are cleared at the same time as the addition result is put into store in the flip-flops 32 and 33 and the shift in the shift register 26 takes place. While this $\bar{H}$ pulse is present, during which there is a binary 1 on the control wire 48 and accordingly the flip-flop 32 is connected to the adder 26 through the AND gates 43, 46 and 47, there is a binary 0 on the control wire 55, owing to the absence of any H pulse while the $\bar{H}$ is present, and the AND gates 56, 57 and 58 connected to that control wire 55 are therefore blocked, the connections between the flip-flop 32 and the register stage 25 being thereby broken. With the disappearance of the $\bar{H}$ pulse and the simultaneous appearance of the H pulse, the AND gates 43, 46 and 47 are closed and the AND gates 56, 57 and 58 opened, thus separating the flip-flop 32 from the adder 26 and switching it into the register stage 25. In this way, during the second half of the time division, the flip-flop 32 is alternatively switched to the adder 26 and into the register stage 25 by successive $\bar{H}$ and H pulses. Once the flip-flop 32 has been switched once more into the register stage 25 of the shift register 24 by the first $\bar{H}$ pulse in the second half of the time division following the first H pulse in the second half of the time division, through the opening of the AND gates 56, 57 and 58 and the simultaneous block of the AND gates 43, 46 and 47, all of the 64 binary digits held in the shift register 24 are shifted one binary position forward by the trailing edge of the H pulse, so that the binary digit of the second-lowest binary position of the binary value of the summation in course of formation for the $m^{th}$ channel in the register stage 25 then stands in the flip-flop 32. It should be mentioned, in this connection, that the AND gates 56, 57 and 58 should be such that a degree of time delay attends their opening in relation to the leading edge and their closing in relation to the trailing edge of the H pulse by which they are tripped, so that in any case the AND gates 46 and 47 are blocked before the AND gates 56 and 57 are opened, and also in order that in any case the onward shift of the binary value in flip-flop 32, caused by the trailing edge of the H pulse, may take place through the AND gate 58 before that gate closes. With the trailing edge of the first H pulse in the second half of the time division, the first stage of addition in the first addition process is completed in the second half of the time division and there begins the second stage of addition in that same first addition process, which proceeds basically in the same way as the first stage of addition described above. The only difference is that, as already stated, no E pulse is present during the second and all subsequent stages of the same addition process and hence the carry-over is fed to the adder 26 from the flip-flop 33 and not, as with the first stage of addition, from the carry-over logic circuit on the assumption of a negative sign to $S(t)\cdot F_m(t)$. Then, during the second and every subsequent addition stage in the addition process considered, both the 64 binary values in the shift rgister 24 and the binary value in the shift register 21 are again moved one binary stage forward, until, after 16 addition stages, the addition process considered is complete and, in consequence of the shift of the binary values in the shift registers 21 and 24 by 16 binary positions in conjunction with the 16 addition stages, the shift register 21 is completely empty or has the digit 0 standing in every binary position, while the binary value standing in the penultimate stage of the shift register 24 before the start of the addition process in question has advanced to the final register stage 25 by the end of the said addition process. The D pulse that coincides with the last H pulse of the first addition process then puts the binary value of |S| into store again in the shift register 21 and the second addition process then starts at the trailing edge of that D pulse, its commencement coinciding with the appearance on the wire WA of the function value, applicable to the time division concerned, of a Walsh function of a different order, for instance of the Walsh function of order $(m + 1)$, and on the wire $\overline{WA}$ of the complement of that function value. The second and all succeeding addition processes then proceed in the same way as the first addition process already described, until, after 64 such addition processes in all, the summation term $S(t_o+kT+(\xi-½/64)T) \cdot F_\nu (t_o+kT+(\xi-½/64)T)$ obtained for the $\xi^{th}$-time division concerned has been added to each of the summations in course of formation in the shift register 24 for the respective channels $l$ to $n$, $\nu$ being the number of the channel to which the particular summation relates and at the same time the order of the Walsh function applicable to that channel. Th second half of the time division that started with the first addition process described above ends simultaneously with completion of the $64^{th.}$ addition process.

Because the shift register 24 has become a closed ring by the connection of its output 22 to its input 23 through the AND gate 59 and the connecting wire 60, the binary digit previously stored in the last flip-flop 32 on the output side of the shift register 24 is advanced each time into the first flip-flop on the input side of the shift register 24 as all the 64 binary digits in the shift register 24 are moved one binary position forward at each of the said addition stages, so that at each of the said addition processes, each comprising 16 stages of addition, the resultant binary value arising from addition of the binary value stored at the start of the addition process in the final register stage 25 of the shift register 24 and the binary value or complement thereof stored in the shift register 21 at the start of the addition process stands in the first register stage of the shaft register 24 at the end of the addition process and accordingly the summation in course of formation for a particular $m^{th.}$ channel makes a complete circuit within the 64-stage shift-register 24 during the said 64 addition stages carried out in the second half of a $\xi^{th.}$ time division.

When the 64 addition processes have been carried out, that is to say at the end of the $\xi^{th.}$ time division, the summations in course of formation for each of the channels $l$ to $n$ are therefore stored in the shift register 24 in the same stage in which they were stored before the start of the 64 additions, that is to say at the beginning of the second half of the $\xi^{th.}$ time division. Now, since the sequence in which the 64 function values $F_o(t)$ to $F_{63}(t)$ of the Walsh functions of order zero to 63 and the complements thereof $\overline{F}_o(t)$ to $\overline{F}_{63}(t)$ are fed over the wires WA and $\overline{WA}$ during the second half of the time division is the same in every time division, and since, according to what has already been stated, the sequence in which the summations in course of formation for the channels $l$ to $n$ arrive in the final register stage 25 of the shift register 24 in the second half of the time division must also be the same in every time division, it follows that, in every time division of a Walsh cycle, the function value $F_m(t)$ applicable to the time division concerned, and its complement $\overline{F}_m(t)$, of the Walsh function of order $m$ for a particular channel arrive on the line WA or $\overline{WA}$ at the same time as the summation in course of formation for that $m^{th.}$ channel reaches the register stage 25, and hence, in every time division of a Walsh cycle, the summation term $S(t) \cdot F_m(t)$ for the time division concerned, for the $m^{th.}$ channel, is added to the summation in course of formation for the $m^{th.}$ channel, so that the summation produced at the end of a Walsh cycle is $$\sum_{\xi=1}^{64} S\left(t_o+kT+\frac{\xi-½}{64}T\right) \cdot F_m\left(t_o+kT+\frac{\xi-½}{64}T\right)$$

to which reference has been made previously. Thus, at the end of a Walsh cycle, one such summation, associated with one or other of the channels $l$ to $n$, stands in each of the 64 stages of the shift register 24.

All of these values stored at the end of a Walsh cycle in the 64 stages of the shift register 24 are now, during the first half of the first time division of the succeeding Walsh cycle, shifted out of the shift register 24 and into the shift register 28, which has 7 × 68 register stages. To that end, the output 22 of the shift register 24 is connected to the input 27 of the shift register 28 by the opening of the AND gate 61, the connection via the AND gate 59 between the output 22 and input 23 of the shift register 24 being broken simultaneously by the closing of the AND gate 59; and the AND gates 52 and 62 are opened, to enable the requisite shift pulses to pass from the control wire H to the shift registers 24 and 28.

To control this onward shift, use is made of the WP pulse fed over the control wire WP during the first half of the first time division in every Walsh period. This pulse acts by way of the line 63 to open the AND gate 61 and over the NAND gate 51 and line 64 to close the AND gate 59, as well as over the NAND gate 51 and wire 65 and on over the NAND gates 50 and 66 to open the AND gates 52 and 62. By this openin of th AND gates 52 and 62 in the first half of the first time division in every Walsh cycle, 64 × 16 H pulses are passed during that time to the step-on inputs of the shift registers 24 and 28 and serve to shift each of the binary values stored in those registers 24 and 28 one binary position forward, so that all the 64 16-figure binary values stored in the shift register 24 at the end of a Walsh cycle are shifted on into the shift register 28 within the first half of the first time division of the succeeding Walsh cycle.

In the second half of the first time division and every further time division of that succeeding Walsh cycle, the summation terms $S(t) \cdot F_m(t)$ for the channels l to $n$ in the time division concerned are then formed once more as described above and added to whatever values are held in the shift register 24, the AND gate 59 having been re-opened and the AND gate 61 simultaneously closed as the WP pulse stops at the end of the first half of the first time division.

In this way, the 8 binary units of information sent by each individual sender within 8 consecutive Walsh cycles, as mentioned above during the explanation of the senders, are determined in those 8 Walsh cycles starting and finishing with a sync. pulse over the synchronising signal wire SY (FIG. 7), the first unit of information being determined for all n channels during the first Walsh cycle, the second unit of information for all n channels during the second cycle, and so on. Then, during the first half of the first time division in each of the second to eighth Walsh cycles, the $n$ units of information determined for the $n$ channels during the previous Walsh period in each case are shifted as described above out of the shift register 24 into the shift register 28, while at the same time all values stored in the shift register 28 are shifted 64 register stages forward at a time. Accordingly, at the end of the 8 Walsh cycles, the group of 64 register stages next to the output 29 of the shift register with its 7 × 64 stages contains the first unit of information from all *n* channels (each of these *n* first units of information being in one of the 64 register stages and consisting of the binary value stored in it), while those groups of 64 register stages which follow in sequence towards the input 27 of the shift register 28 contain respectively the second, third, fourth, fifth, sixth and seventh units of information from all *n* channels, whereas the eighth unit of information from the *n* channels still stands in the shift register 24 at the end of the 8 Walsh cycles.

As already described during the explanation of the senders, during the next 8 Walsh cycles — unless there has since been a change in cable temperature and in the alarm conditions (oil leaks) to be transmitted — each sender again emits the same 8 binary units of information as in the 8 Walsh cycles just ended. Where the condition of the cable has remained unchanged, therefore, the same "word" made up of 8 constant binary units of information is always being emitted by every one of the *n* senders. This opens the possibility of correlation over a large number of consecutive words and thereby of considerable improvement in the disturbance gap or the difference in level by which the correlation result lies above the noise level. Such correlation is highly important, particularly in the present application, because the signal wire, like the senders themselves, lies within the casing of the high-voltage cable, so that the noise level produced in the signal wire by the high-voltage cable, by inductance/capacity coupling, is relatively high.

For the purpose of such correlation, therefore, 32 consecutive words at a time are correlated, the first units of information of all 32 words (or the binary equivalents thereof) are added together, the second units of information of all 32 words are added together, and so forth. For this purpose, during the train of 8 Walsh cycles immediately following the first train of 8 Walsh cycles, in the first half of the first time division of every Walsh cycle, the units of information standing in the last group of 64 register stages on the output side of the shift register 28 at the end of the preceding Walsh cycle are shifted by way of the AND gate 67 into the shift register 24 and simultaneously the units of information held in the shift register 24 at the end of the preceding Walsh cycle are shifted by way of the AND gate 61 into the first group of 64 register stages on the input side of the shift register 28. The opening of the AND gate 67 is brought about simultaneously with the opening of the AND gate 61 and the closing of the AND gate 59 by the WP pulse already mentioned, which is always present during the first half of the first time division of every Walsh cycle. Since, at the end of the first train of 8 Walsh cycles, the first, second, . . . seventh units of information from all *n* channels are held in that oreder by the 7 goups of 64 register stages running from the output 29 of the shift register 28 and the eighth unit of information from all *n* channels is held by the shift register 24, as explained above, it follows that during the immediately following train of 8 Walsh cycles, the first unit of information from all *n* channels arrives at the start of the first Walsh cycle, the second unit of information from all *n* channels arrives at the start of the second Walsh cycle, and so on, in the shift register 24, where in each instance the first or second etc. unit of information from all n channels is again added on, and this is repeated throughout an entire evaluation period comprising altogether 32 such trains of 8 Walsh cycles each.

AT the end of those 32 trains of 8 Walsh cycles each, i.e. at the end of the evaluation period, the first of the 7 groups of 64 register stages from the output 29 of the shift register 28 contains the first unit of information from all *n* chnnels correlated 32 times, the second group contains the second unit of information from all *n* channels correlated 32 times, and so on, and the eighth unit of information from all *n* channels correlated 32 times is held in the shift register 24. In the first half of the first time division of the first Walsh cycle following the end of the evaluation period (which already forms part of the next evaluation period immediately following the one just ended), the 24 values standing in the shift register 24 are shifted — just as at the start of every other Walsh cycle — through the AND gate 61 opened by the WP pulse, into the first group of 64 register stages on the input side of the shift register 28, the AND gate 59 being closed as the AND gate 61 is opened, and, simultaneously with the shift of the 24 values previously held by the shift register into the shift register 28, all the values stored in the shift register 28 are shifted forward 64 register stages at a time.

The 28 values thus shifted out of the shift register 28, through the output 29, namely the first unit of information from all *n* channels correlated 32 times, are now — being end values, of course — shifted out of the evaluator AU through the AND gate 68 and the evaluator output A . The AND gate 68 is opened by the AP pulse delivered by the control wire AP and available during the first eight half time divisions of the first Walsh cycle following the end of any evaluation period. Simultaneously with the opening of the AND gate 68, the AP pulse acts through the NAND gate 69 to close the AND gate 67. Since, for that reason, in the first half of te first time division of the first Walsh cycle following the end of an evaluation period, that is to say while the values are being shifted from the shift register 24 into the shift register 28, a binary 0 stands at the input 23 of the shift register 24 (both the AND gates 67 and 59 being closed), the shift register is completely emptied during that time and hence, at the start of the second half of that first time division, when storage of the first of the products $S(t)\cdot F_m(t)$ determined in the new evaluation period begins in the shift register 24, there is in each instance a biary 0 in all 16 positions of all 64 register stages in the shift register 24, the condition for the start of the new evaluation period being thus fulfilled as far as the shift register 24 is concerned.

In the second to eighth half time divisions of the first Walsh cycle following the end of an evaluation period, the new evaluation period ia already running in the shift register 24 (since, after the first half time period, the AND gate 59 was re-opened and the AD gate 61 was closed at the cessation of the WP pulse), and simultaneously in this second to eighth half time division the end values of the preceding evaluation period stored in the shift register 28 are shifted out of the evaluation AU via the AND gate 68, now opened by the AP pulse, and the evalator output A. So that the necessary shift pulses may be passed to the shift register 28 in this second to eighth half time division over the control wire H and the AND gate 62, the AND gate 62 is held open by the AP pulse by way of the NAND gates 69 and 66 until the end of this eighth half time division. As the AND gate 61 is already closed at the end of the first half time division of the first Walsh cycle following the end of the evaluation period, there is a binary 0 at the input 27 of the shift register 28 in the ensuing second to eighth half time division, so that at the end of the eighth half time division, when all the end values have been retrieved from the shift register 28, there is also a binary 0 in every instance in all 16 positions of all 7 × 64 stages of the shift register 28, so that the condition for the start of the new evaluation period is also fulfilled as regards the shift register 28.

Then the end values shifted out of the evaluator AU through its output A can either be fed over a line, in the available pulse-train form, to a monitoring centre at a distance from the location of the receiver and there evaluated, or be directly sorted and evaluated in the conventional manner in a sorting device associated with the receiver.

The processes then, in the said new evaluation period and all subsequent periods, proceed in the same way as in the evaluation period described above. Every evaluation period comprises 32 × 8 Walsh cycles and the individual evaluation periods follow one another, as already stated, in unbroken succession.

The control signals for controlling the evaluator AU and the function values of the Walsh functions of order zero to 63 and the complements thereof, as well as the synchronising signals to be fed to the synchronising signal wire, are all supplied by the Walsh function generator WE shown in FIG. 7 over the control wires AP, WP, HT, E, D and H leading to the evaluator AU and the wires WA and $\overline{\text{WA}}$ leading likewise to the evaluator, over the control wire SY leading to the synchronising signal wire and over the control wire TK leading to the timing signal wire. The Walsh function generator WE is energised by an oscillator, OS (vide FIG. 1), which supplies a square or sinusoidal oscillation of constant frequency and amplitude over the feed wire OS to the Walsh function generator. This frequency is basically open to choice, but the evaluation period of approximately one minute's duration desirable in the present application requires an oscillation frequency of about 1 Mc./s. In the Walsh function generator WE, the oscillation supplied by the oscillator OS is passed to the 26-stage counter, which delivers the H pulses at the 1 output of the first stage, the HT pulses at the 0 output of the 12th. stage and the timing pulses at the 1 output of the 13th. stage and which also controls the AND gate 70 (supplying D pulses) with the 1 outputs of the first to fifth stages, the AND gate 71 (supplying E pulses) with the 0 outputs of the first to fifth stages and the AND gates 72 to 75, which in turn control the AND gate 76 supplying WP pulses and the AND gate 77 supplying AP pulses, with the 0 outputs of the 12th. to 26th. stages. Moreover, the counter controls with the 1 outputs of its 6th. to 11th. and 13th. to 18th. stages and AND gate 78 to 83, which, with the logic circuit connected to their outputs, provide, in one time division each, the function values $\overline{F}_0(t)$ to $\overline{F}_{63}(t)$, applicable to the time division concerned, of the Walsh functions of order zero to 63 and the complements $F_0(t)$ to $F_{63}(t)$ thereof. Finally, the counter triggers the multivibrator 30 with the leading edge of the pulse delivered by the 0 output of its 21st. stage and the monostable multivibrator 31 with the leading edge of the pulse delivered by the 0 output of its 26th. stage. The multivibrator 30 generates the sync. pulses fed to the synchronising signal wire, the appearance of which pulses sets the 1st. to 21st. stages of the counter to zero and thereby initiates in each instance a succession of 8 consecutive Walsh cycles. At the srart of every new evaluation period, the multivibrator generates the sync. pulse for the entire counter. This pulse is fed directly to the 22nd. to 26th. stages of the counter and via the AND gate 84 to the 1st. to 21st. stages. The duration of the sync. pulses generated by the monostable multivibrators 30 and 31 is shorter than that of an H pulse. Triggering the multivibrator 31 when the cable monitoring installation is started up ensures that at that moment all stages of the counter and all n senders are synchronised, so that the moment of starting up sees also the start of a new evaluation period and the very first evaluation period produces useful results. Otherwise, the starting up may fall anywhere within an evaluation period, in which event useful results are not obtained until the second, that is to say the first complete, evaluation period.

With an oscillation frequency of 1 Mc./s., the duration of the H, D and E pulses is 1 microsecond, that of the HT pulses 2.048 milliseconds, that of the timing or TK pulses 4.096 milliseconds, that of a Walsh cycle 0.262144 seconds, that of a word 2.097152 seconds and that of an evaluation period 67.108864 second, or approximately one minute.

Finally, with regard to the multivibrators 30 and 31, it should be noted that the pulses they produce, given an oscillator frequency of 1 Mc./s., have a duration of approximately half a microsecond and are high enough to be still able to provide satisfactory synchronisation of the sender most distant from the receiver, even after transmission over the synchronising signal wire. For the same purpose of satisfactory transmission to all senders, the timing pulses delivered at the 1 output of the 13th. stage of the counter are amplified by the amplifier 85 before being applied to the timing signal wire.

What we claim is:

1. A method for transmission of informations supplied simultaneously over *n* separate signal channels, wherein these informations are transmitted simultaneously over a common signal path with the aid of *n* carrier signals, each associated with one of the signal channels, on which carriers the informations supplied over the respective signal channels are impressed, the carrier signals employed consisting of *n* different functions $F_l(t)$ to $F_n(t)$ of time *t*, orthonormal to one another, each of which is repeated at the expiration of a cycle beginning at the same instant $t_0+k$T for all functions $F_l(t)$ to $F_n(t)$ and having the same duration T and which, for any index values $\mu$ and $\nu$ lying between *l* and *n* and for any positive integer values *k* , fulfil the condition $$\frac{1}{T}\int_{t_0+kT}^{t_0+(k+1)T} F_\mu(t)\cdot F_\nu(t)\,dt = \begin{cases} 0 & \text{for } \mu\neq\nu \\ \text{const.} & \text{for } \mu=\nu. \end{cases}$$

the carrier signals on which the information from the respective signal channels have been impressed being superimposed on the common signal path so that a summation signal S($t$) is formed and transmitted over the common signal path, the informations supplied over any $m^{th.}$ signal channel and incorporated in the summation signal being filtered out again, after transmission of duration$\Delta t_m$, with the assistance of the integration $$\frac{1}{T}\int_{t_o+kT+\Delta t_m}^{t_o+(k+1)T+\Delta t_m} S(t-\Delta t_m)\cdot F_m(t-\Delta t_m)dt$$

by synchronous correlation between the summation signal $S(t-\Delta t_m)$ that has undergone a time-shift equal to the transmission time $\Delta t_m$ and a time function $F_m(t-\Delta t_m)$ in period synchrony with the summation signal $S(t-\Delta t_m)$ and corresponding to the carrier signal for the $m^{th.}$ signal channel; characterised by teh fact that the informations in each of the $n$ signal channels are supplied in binary form, the duration of a one-bit unit of information being made the same for all these binary informations supplied over the $n$ signal channels, that the cycle duration T of the time functions $F_l(t)$ to $F_n(t)$ used as carrier signals is made equal to the said duration of one unit of information of said binary informations, and that the individual units of information of the binary informations supplied over any $m^{th.}$ signal channel are transmitted, according to the binary decision contained in the unit of information, bu applying or not applying to the common signal path the carrier signal assocaited with the $m^{th.}$ signal channel, for a complete carrier-signal cycle in every instance, over the common signal path, and are directly regained, after transmission, as integration result, from the integral $$\frac{1}{T}\int_{t_o+kT+\Delta t_m}^{t_o+(k+1)T+\Delta t_m} S(t-\Delta t_m)\cdot F_m(t-\Delta t_m)dt$$

2. A method as claimed in claim 1, in which the units of information in the individual signal channels are supplied by associated sources of information in the form of immediately consecutive words, each of which comprises a pre-determined number $p$ — the same for all words supplied on the same signal channel — of binary units of information, the words that contain the information preferably being repeated, when the units of information of the information sources remain unchanged, until the units of information change.

3. A method as claimed in claim 2, in which, on each of the $n$ signal channels, each of the words supplied comprises a number $p$ — the same number for all words — of binary units of information.

4. A method as claimed in claim 2, in which, to prevent such errors in transmission of the information as might be caused by faults on the common signal path, the individual words are each repeated many times by the information sources upplying them, a number of successive words being evaluated for determination of the invormation content of those words, for which purpose the duration of the words supplied by the information sources is made many times shorter than the period during which a unit of information from those information sources remains constant or during which the information from those sources representing an analogue magnitude lasts as a minimum in the event of a maximum change, in the same direction, of that magnitude.

5. A method as claimed in claim 4, in which $q$ immediately consecutive words, each comprising $p$ units of information in $p$ successive positions and of which the first word in a $z^{th.}$ evaluation cycle starts at an initial point in time $t_A=t_o+k_oT+(z-1)pqT+\Delta t_m$, are evaluated for determining the information content, the sum $$\sum_{y=1}^{q}\frac{1}{T}\int_{t_A+(x-1+p(y-1))T}^{t_A+(x+p(y-1))T} S(t-\Delta t_m)\cdot F_m(t-\Delta t_m)dt$$

being formed, for each position of these words, of the integration results of all $q$ words in this $x^{th.}$ position, and a binary decision for the position concerned being made, preferably with the aid of threshold-value circuitry, on the basis of the result of that summation.

6. A method as claimed in claim 4, in which the units of information are used for transmitting the values of physical or chemical magnitudes subject to variation with time, for which purpose the maximum possible range of variation of those values, which are to be transmitted over an $m^{th.}$ signal channel, is divided into a number of adjacent fractional ranges, preferably to the number of $2^w$, to each of which fractional ranges a characteristic binary number comprising $w$ binary units of information is allotted, that binary number being fed as a word or part of a word to the $m^{th.}$ signal channel when the value to be transmitted lies within that allotted fractional range; and in which the duration chosen for the individual words to be transmitted over the $m^{th.}$ signal channel is many times shorter than the minimum time required by the time-variable magnitude, the value of which is to be transmitted over the $m^{th.}$ signal channel, to pass through one fractional range.

7. A method as claimed in claim 5, in which the binary numbers allotted to the individual fractional ranges are such, or are so converted by Gray coding before transmission over the common signal path, that binary numbers denoting adjacent fractional ranges differ from each other only in their $w$ positions; and in which, after the said summation, it is determined for each of the said $p$ word positions whether the result of summation falls either into a pre-determined tolerance range, the width of which is governed by the permissible noise level, by a value equal in magnitude to zero and representing the binary decision zero, or into a similar pre-determined tolerance range by a value equal in magnitude to $q$ times the said integration result obtained in the complete absence of noise for a single unit of information transmitted by the impression of the associated carrier signal on the common signal path, which value represents the binary decision "one," or, again, into a range outside both of those tolerance ranges; and in which, the foregoing having been determined, a word is formed when in at least $(p-1)$ of the $p$ positions the summation result falls into one of the two tolerance ranges, so that well-defined binary decisions are produced for the positions in question; and in which that word, from which it can be deduced that the value of the physical or chemical magnitude to be transmitted lies within two particular adjacent fractions of the said range of variation, is passed forward as the transmission result, preferbly being converted from the Gray code to the natural binary code before being passed forward.

8. A method as claimed in claim 1, in which the orthonormal functions $F_l(t)$ to $F_n(t)$ chosen are Walsh functions, the cycle of which is divided into s equal time divisions, at the transitions from the first to the next of which may lie abrupt variations in the Walsh functions, s being a power of two which is at least equal to that power of two which is next higher in relation to $n$.

9. A method as claimed in claim 8, in which to determine the integral $$\frac{1}{T}\int_{t_o+kT+\Delta t_m}^{t_o+(k+1)T+\Delta t_m} S(t-\Delta t_m)\cdot F_m(t-\Delta t_m)dt$$

the summation corresponding to this and divided by $s$, $$\frac{1}{s}\sum_{\xi=1}^{s} S\left(t_o+kT+\frac{\xi-\frac{1}{2}}{s}T\right)\cdot F_m\left(t_o+kT+\frac{\xi-\frac{1}{2}}{s}T\right)$$

is obtained from the products which, in the $s$ individual time divisions of the determination period extending from the moment $(t_o+kT+\Delta t_m)$ to the moment $(t_o+(k+1)T+\Delta t_m)$, are obtained by multiplying the value $S(t_o+kT+(\xi-\frac{1}{2}/s)T)$ of the time-shifted summation signal $S(t-\Delta t_m)$ in the particular $\xi^{th}$ time division of the determination period by the value $F_m(t_o+kT+(\xi-\frac{1}{2}/s)T)$ of the time function $F_m(t-\Delta t_m)$ in period synchrony with the time-shifted summation signal in that $\xi^{th}$ time division.

10. A method as claimed in claim 9, in which the time-shifted summation signal S in each individual time division is multiplied by each of the $n$ time function $F_l$ to $F_n$ and the $n$ products $S.F_l$ to $S.F_n$ of those multiplications are added singly in sequence, in the final output-side stage of an n-stage shift register forming a closed ring by connection of its output to its input, to whatever value is held therein; and in which, after each such addition, the values held in the individual stages of the shift register are shifted one stage forward, so that the values held in the shift register carry out one complete circuit in the shift register during every time division and accordingly the products $S.F_m$ associated with a given $m^{th}$ signal and formed in successive time divisions, in each instance one time division apart, are added together in the shift register, so that within one determination period the said sum of the products $S.F_m$ is formed.

11. A method as claimed in claim 3, in which, over a complete evaluation cycle comprising p.q consecutive determination periods, the connection between the output and input of the n-stage shift register is broken between every two consecutive determination periods, following which the output of the n-stage shift register is connected to the input of a further shift register having $(p-1)$ .n stages and the input of the n-stage shift register is connected to the output of that further register and then, in the ring thus formed from the n-stage shift register and the futher shift register, the values in the individual register stages are shifted forward $n$ stages at a time, after which the further shft register is separated again from the n-stage shift register and connection is re-established between the output and input of the n-stage shift register and then, at the end of the evaluation cycle, the values in the n-stage shift register and in the further shift register, each of which constitutes the sum $$\frac{1}{s}\sum_{y=1}^{q}\sum_{\xi=1}^{s} S\left[t_o+(k_o+(x-1))+p(y-1)+pq(z-1)+\frac{\xi-\frac{1}{2}}{s}T\right]\cdot F_m\left[t_o+(k_o+(x-1))+p(y-1)+pq(z-1)+\frac{\xi-\frac{1}{2}}{s}T\right]$$

of the integration resuluts of an $x^{th}$ position of all the $q$ words delivered over an $m^{th}$ signal channel in the $z^{th}$ evaluation cycle just ended, are withdrawn from these two shift registers, a fresh evaluation cycle being started after withdrawl of the values from the n-stage shift register.

12. A method as claimed in claim 11, in which, for withdrawing the values stored in the two shift registers, the connection is broken between the input and output of the n-stage shift register and its output is connected to the input of the further shift register and the values in both the registers are then, by further shifting by n.p stages, discharged from the two registers via the output of the further register, and after the first n-stage shift the n-stage shift register thereby cleared is again separated from the further shift register and connection is re-established between input and output of the n-stage shift register, whereupon the fresh evaluation cycle starts.

13. A method as claimed in claim 1, in which, for transmitting information from several differently located senders to a common reception point, the common signal path is routed from the reception point through each of the send locations, a separate sender being provided at each send location and a central receiver at the common reception point; and in which, for filtering out, in the central receiver, the information allotted to the individual channels from the summation signal arriving at the reception point, $n$ period-synchronous time functions $F_l$ to $F_n$ are generatd and, for synchronisation of the carrier signals contained in the summation signal arriving at the reception point, synchronising signals are generated with those time functions and fed to the receiver and to the individual senders and with their aid in the receiver the strat of cycle of the time functions $F_l$ to $F_n$, and in the individual senders the start of cycle of the carrier signals applied to the common signal path by the sender concerned, are so determined that the carrier signals, after transmission from the sender concerned to the central receiver, which requires a certain transmission time, are at least approximately in period synchrony at the reception point with the time functions $F_l$ to $F_n$ generated in the receiver.

14. A method as claimed in the claim 8, in which the synchronising signals passed to the receiver and the individual senders trigger the start of cycle of the time functions $F_l$ to $F_n$ generated in the receiver as they arrive in the receiver and trigger the start of cycle of the carrier signals applied to the common signal path by the sender concerned as they arrive in the individual senders; and in which the duration chosen for the time divisions is greater than the time summation derived from the transmission time of the synchronising signals from the receiver to the most distant sender on the common signal path and the transmission time of the carrier signals from that most distant sender to the receiver.

15. A method as claimed in claim 8, in which control signals derived from the synchronising signals fed to the receiver cause within the receiver a backward shift of the start of cycle of the time functions $F_l$ to $F_n$ generated therein, in relation to the synchronising signals generated in the receiver, by a time interval at least equal to the time summation derived from the transmission time of the synchronising signals from the receiver to the nearest sender on the common signal path and the transmission time of the carrier signals from that nearest sender to the receiver, and at most equal to the time summation derived from the transmission time of the synchronising signals from the receiver to the most distant sender on the common signal path and the transmission time of the carrier signals from that most distant sender to the receiver, and preferably equal to the mean value between those two time summations, those control signals preferably following the synchronising signals in the said time interval and, as they arise, triggering the start of cycle of the time functions $F_l$ to $F_n$ generated in the receiver; and in which the synchronising signals fed to the senders, as they appear in the individual senders, trigger the start of cycle of the carrier signals applied by the sender concerned to the common signal path; and in which the chosen duration of the time divisions is both greater than the difference between the duration of the said time interval required in all for transmission of the synchronising signals from the receiver to the nearest sender and for transmission of the carrier signals from the nearest sender to the receiver, and greater than the difference resulting between the time required in all for transmission of the sysnchronising signals from the receiver to the most distant sender and for transmission of the carrier signals from the most distant sender to the receiver and the length of the said time interval.

16. A method as claimed in claim 13, in which, in the individual senders, the start of cycle of the carrier signals applied by the sender concerned to the common signal path is shifted forward in time, in relation to the start of cycle of the time functions $F_l$ to $F_n$ generated in the receiver, by the transmission time from the sender concerned to the central receiver and this forward shift is maintained by the synchronising signals fed by the central receiver.

17. A method as claimed in claim 14, in which control signals derived from the synchronising signals fed to the receiver and the individual senders cause in the receiver a backward shift of the start of cycle of the time functions $F_l$ to $F_n$ generated therein and in the individual senders a backward shift of the start of cycle of the carrier signals generated therein, in each instance by a time interval, in relation to the synchronising signals supplied, which, at the receiver, equals the time summation derived from the transmission time of the synchronising signals from the receiver to the most distant sender on the common signal path and the transmission time of the carrier signals from that most distant sender to the receiver and an additional time shift lying optionally between zero and the time difference between two successive synchronising signals and, at the individual senders, equals the time summation derived from the transmission time of the synchronising signals from the sender concerned to the most distant sender and the transmission time of the carrier signals from the most distant sender to the sender concerned and the said additional time shift, the control signals derived from the synchronising signals preferably following the synchronising signals provided in the said time interval and, as they appear, triggering the start of cycle of the time functions $F_l$ to $F_n$ in the receiver and the start of cycle of the carrier signals in the individual senders.

18. A method as claimed in claim 17, in which the synchronising signals are generated periodically and the additional time shift is equal to the difference between the duration of a synchronising signal cycle and the total time required for transmission of the synchronising signal from the receiver to the most distant sender and for transmission of the carrier signals from the most distant sender to the receiver, so that the time interval by which the control signals in the receiver cause a backward shift in the start of cycle of the time functions $F_l$ to $F_n$ generated therein in relation to the synchronising signals fed to the receiver is equal to the duration of a synchronising signal cycle and hence the periodically generated synchronising signals themselves can be used as control signals in the receiver.

19. A method as claimed in claim 3, in which the synchronising signals are generated periodically and the chosen duration of a synchronising signal cucle is equal to the duration of a word, and in which, in the individual senders, the start of each of the words supplied by the associated information sources is set to the same moment as the start of cycle set by means of the synchronising signals for the carrier signals applied by the sender concerned to the common signal path, so that each of the words from all senders, after transmission from the sender concerned to the central receiver, starts at least approximately at the same moment at the reception point.

20. A method as claimed in claim 11, in which the synchronising signals are generated periodically and the chosen duration of a synchronising signal cycle is equal to the duration of an evaluation cycle comprising q consecutive words, and in which, in the individual senders, the start of the first words in each evaluation cycle supplied by the associated information sources is set to the same moment as the start of cycle set by means of the synchronising signals for the carrier signals applied by the sender concerned to the common signal path, so that each of the first words in each evaluation cycle from all senders, after transmission from the sender concerned to the central receiver, starts at least paproximately at the same moment at the reception point.

21. A method as claimed in claim 13, in which, as period-synchronous time functions $F_l$ to $F_n$ and as carrier signals, use is made of Walsh functions, the cycle of which is divided into s equal time divisions, $s$ being a power of two, $2^r$, which is at least equal to the power of two next above $n$, and in the central receiver a timing oscillation in the form of a square pulse with a duration corresponding to twice the time division is generated and sent to the individual senders, the timing oscillation being used in the receiver for generating the Walsh functions constituting the time functions $F_l$ to $F_n$ and in the individual senders for generating the Walsh functions constituting the carrier signals applied by the sender concerned to the common signal path.

22. A method as claimed in claim 21, in which the Walsh functions in the receiver and in the individual senders are derived from Rademacher functions, which in turn are generated from the timing oscillation by means of an ($r$—1)-stage binary counter controlled by the timing oscillation and stepping one count forward for every cycle of the timing oscillation, and, for deriving a predetermined Walsh function from the Rademacher functions arising at the counter input and at the count-stage outputs of the ($r$—1)-stage binary counter, pre-determined Rademacher functions appropriate to the Walsh functions to be derived are selected and the binary values represented by these are added on a binary basis in the binary zero order position and, according to the binary decision arising as the result of that addition, one or other of the two functions values which a Walsh function can assume is set up, the function value thus set up being the function value of the derived Walsh function in the time division associated with the count of the ($r$—1)-stage binary counter and the function value of the timing oscillation.

23. A method as claimed in claim 10, in which, in the receiver, to generate the function values of all n Walsh functions constituting the time functions $F_l$ to $F_n$, in every individual time division, each of the $r$ Rademacher functions arising at the counter input and at the outputs of the various counting stages of the ($r$—1)-stage binary counter is applied to a line connected to the input and output concerned, which is routed through and can be completed by an electronic switch, each of those elecronic switches being operated by one of the $r$ counting stages in a further r-stage binary counter, which passes through $n$ pre-determined count positions in every time division, and is opened or closed according to the position of the counting stage by which it is operated; and in which, over the lines when thus completed, the binary-values represented by the Rademacher functions applied to those completed lines — and, over the lines when not so completed, the binary values zero — are fed into an adding devcie, in which the binary values fed in from all the lines are added binarily in the binary zero order position and by which, according to the binary decision of the number produced as the result of that addition, one or other of the functions values which a Walsh function can assume is set up, the function value so set up being the function value of the Walsh function associated with the instantaneous count of the said r-stage binary counter in the time division associated with the count of the ($r$—1)-stage binary counter and the function value of the timing oscillation.

24. A method as claimed in claim 14, in which the ($r$—1)-stage binary counters in the receiver and in the individual senders are set, by the synchronising signals fed to the receiver and the individual senders, to the start-of-cycle count level, preferably zero.

25. A method as claimed in claim 15, in which the ($r$—1)-stage binary counter in the receiver is set in each instance, by setting pulses constituting the said control signals, which occur at least approximately at the same moment as the synchronising signals that give rise to them, to a count level which is in advance of the start-of-cycle count, preferably zero, of that binary counter by the said time interval or by a number of count units corresponding to the quotient of time interval/time division; and in which the ($r$—1)-stage binary counters in the individual senders are set to the start-of-cycle count level, preferably zero, by the synchronising signals associated with the individual senders.

26. A method as claimed in claim 17, in which the ($r$—1)-stage binary counters in the receiver and in the individual senders are set in each instance, by setting pulses constituting the said control signals, which occur at least approximately at the same moment as the synchronising signals that give rise to them, to a count level which is in advance of the start-of-cycle count, preferably zero, of the binary counter to which the setting pulses are applied, by the said time interval associated with the receiver or sender in which that binary counter is incorporated or by a number of count units corresponding to the quotient of time interval/time division derived from that time interval and from the time division.

27. A method as claimed in claim 8, in which a two-core cable is used as the common signal path, an impedance, preferably an ohmic resistance and a voltage source in series being connected to the two conductors in the cable at the reception point, and the summation signal that arrives at the reception point is picked up via the impedance; and in which, at each sending point, for each separate signal channel over which information is supplied at the sender concerned, there is connected to each conductor in the cable a separate series arrangement for the signal channel concerned, consisting of a further impedance, preferably also an ohmic resistance and an electronic switch; and in which the electronic switch, when the carrier signal allotted to the signal channel concerned is not applied to the common signal path, is moved to one or other of its two switching positions "open" and "closed" — preferably to the "open" position — and, when the carrier signal consisting of a Walsh function allotted to the signal channel concerned is applied to the common signal path, is moved to one of its two switching positions when the Walsh function constituting the carrier signal assumes one of the two function values which that Walsh function can assume, and is moved to the other of its two switching positions when the Walsh function constituting the carrier signal assumes the other of the two function values which that function can assume.

28. A method as claimed in claim 27, in which the further impedances in the series arrangements connected to line at the individual sending points are such that when any electronic switch is closed in the series arrangements connected to line at the individual sending points, the same increase in voltage occurs in each instance at the impedance forming part of the series arrangements at the reception point, ohmic resistances preferably being used as impedances in all the series arrangements and the magnitudes chosen for those ohmic resistances being equal in each case to the difference between a pre-determined resistance value, higher than the ohmic line resistance from the reception point to the sending point most distant along the line, and the value of the ohmic line resistance from the reception point and that sending point at which the series arrangement incorporating the ohmic resistance concerned is connected to line.

29. The application of the method as claimed in claim 1 to the automatic monitoring, from a central point, of a number of measuring points situated at different locations, a sender being provided at each measuring point and a receiver at the central point, the measuring values obtained at the various measuring points being transmitted to the receiver in each instance by the sender associated with the measuring point concerned.

30. Application as claimed in claim 29 to cable monitoring and in particular to the monitoring of a high tension cable in regard to its temperature by temperature sensing and in regard to possible leaks by detecting any leakage of cable oil and by detecting any penetration of water into the cable.

* * * * *

UNITED STATES PATENT OFFICE
CERTIFICATE OF CORRECTION

Patent No. 3,789,145 Dated January 29, 1974

Inventor(s) Arvind Shah, et al.

It is certified that error appears in the above-identified patent and that said Letters Patent are hereby corrected as shown below:

Cancel columns 35 thru 44 and substitute the attached columns 35 thru 48.

Signed and sealed this 30th day of April 1974.

(SEAL)
Attest:

EDWARD M.FLETCHER,JR.
Attesting Officer

C. MARSHALL DANN
Commissioner of Patents over any $m^{th}$ signal channel and incorporated in the summation signal being filtered out again, after transmission of duration $\Delta t_m$, with the assistance of the integration $$\frac{1}{T}\int_{t_o+kT+\Delta t_m}^{t_o+(k+1)T+\Delta t_m} S(t-\Delta t_m)\cdot F_m(t-\Delta t_m)dt$$

by synchronous correlation between the summation signal $S(t-\Delta t_m)$ that had undergone a time-shift equal to the transmission time $\Delta t_m$ and a time function $F_m(t-\Delta t_m)$ in period synchrony with the summation signal $S(t-\Delta t_m)$ and corresponding to the carrier signal for the $m^{th}$ signal channel: wherein improvement comprises supplying the informations in each of the $n$ signal channels are supplied in binary form, the duration of a one-bit unit of information being made the same for all these binary informations supplied over the $n$ signal channels, in which the cycle duration T of the time functions $F_l(t)$ to $F_n(t)$ used as carrier signals is made equal to the said duration of one unit of information of said binary informations, and in which the individual units of information of the binary informations supplied over any $m^{th}$ signal channel are transmitted, according to the binary decision contained in the unit of information, by applying or not applying to the common signal path the carrier signal associated with the $m^{th}$ signal channel, for a complete carrier-signal cycle in every instance, over the common signal path, and are directly regained, after transmission, as integration result, from the integral $$\frac{1}{T}\int_{t_o+kT+\Delta t_m}^{t_o+(k+1)T+\Delta t_m} S(t-\Delta t_m)\cdot F_m(t-\Delta t_m)dt$$

2. A method as claimed in claim 1, in which the units of information in the individual signal channels are supplied by associated sources of information in the form of immediately consecutive words, each of which comprises a pre-determined number $p$—the same for all words supplied on the same signal channel—of binary units of information, the words that contain the information preferably being repeated, when the units of information of the information sources remain unchanged, until the units of information change.

3. A method as claimed in claim 2, in which, on each of the $n$ signal channels, each of the words supplied comprises a number $p$—the same number for all words—of binary units of information.

4. A method as claimed in claim 2, in which, to prevent such errors in transmission of the information as might be caused by faults on the common signal path, the individual words are each repeated many times by the information sources supplying them, a number of successive words being evaluated for determination of the information content of those words, for which purpose the duration of the words supplied by the information sources is made many times shorter than the period during which a unit of information from those information sources remains constant or during which the information from those sources representing an analogue magnitude lasts as a minimum in the event of a maximum change, in the same direction, of that magnitude.

5. A method as claimed in claim 4, in which $q$ immediately consecutive words, each comprising $p$ units of information in $p$ successive positions and of which the first word in a $z^{th}$ evaluation cycle starts at an initial point in time $t_A=t_o+k_oT+(z-1)pqT+\Delta t_m$, are evaluated for determining the information content, the sum $$\sum_{y=1}^{q}\frac{1}{T}\int_{t_A+(x-1+p(y-1))T}^{t_A+(x+p(y-1))T} S(t-\Delta t_m)\cdot F_m(t-\Delta t_m)dt$$

being formed, for each position of these words, of the integration results of all $q$ words in this $x^{th}$ position, and a binary decision for the position concerned being made, preferably with the aid of threshold-value circuitry, on the basis of the result of that summation.

6. A method as claimed in claim 4, in which the units of information are used for transmitting the values of physical or chemical magnitudes subject to variation with time, for which purpose the maximum possible range of variation of those values, which are to be transmitted over an $m^{th}$ signal channel, is divided into a number of adjacent fractional ranges, preferably to the number of $2^w$, to each of which fractional ranges a characteristic binary number comprising $w$ binary units of information is allotted, that binary number being fed as a word or part of a word to the $m^{th}$ signal channel when the value to be transmitted lies within that allotted fractional range; and in which the duration chosen for the individual words to be transmitted over the $m^{th}$ signal channel is many times shorter than the minimum time required by the time-variable magnitude, the value of which is to be transmitted over the $m^{th}$ signal channel, to pass through one fractional range.

7. A method as claimed in claim 5, in which the units of information are used for transmitting the values of physical or chemical magnitudes subject to variation with time, for which purpose the maximum possible range of variation of those values, which are to be transmitted over an $m^{th}$ signal channel, is divided into a number of adjacent fractional ranges, preferably to the number of $2^w$, to each of which fractional ranges a characteristic binary number comprising $w$ binary units of information is allotted, that binary number being fed as a word or part of a word to the $m^{th}$ signal channel when the value to be transmitted lies within that allotted fractional range; and in which the duration chosen for the individual words to be transmitted over the $m^{th}$ signal channel is many times shorter than the minimum time required by the time-variable magnitude, the value of which is to be transmitted over the $m^{th}$ signal channel, to pass through one fractional range and in which the binary numbers allotted to the individual fractional ranges are such, or are so converted by Gray coding before transmission over the common signal path, that binary numbers denoting adjacent fractional ranges differ from each other only in their $w$ positions; and in which, after the said summation, it is determined for each of the said $p$ word positions whether the result of summation falls either into a pre-determined tolerance range, the width of which is governed by the permissible noise level, by a value equal in magnitude to zero and representing the binary decision "zero", or into a similar pre-determined tolerance range by a value equal in magnitude to $q$ times the said integration result obtained in the complete absence of noise for a single unit of information transmitted by the impression of the associated carrier signal on the common signal path, which value represents the binary decision "one", or, again, into a range outside both of those tolerance ranges; and in which, the foregoing having been determined, a word is formed when in at least $(p-1)$ of the $p$ positions the summation result falls into one of the two tolerance ranges, so that well-defined binary decisions are produced for the positions in question; and in which that work, from which it can be deduced that the value of the physical or chemical magnitude to be transmitted lies within two particular adjacent fractions of the said range of variation, is passed forward as the transmission result, preferably being converted from the Gray code to the natural binary code before being passed forward.

8. A method as claimed in claim 1, in which the orthonormal functions $F_l(t)$ to $F_n(t)$ chosen are Walsh functions, the cycle of which is divided into $s$ equal time divisions, at the transitions from the first to the next of which may lie abrupt variations in the Walsh functions, s being a power of two which is at least equal to that power of two which is next higher in relation to $n$.

9. A method as claimed in claim 8, in which to determine the integral $$\frac{1}{T}\int_{t_o+kT+\Delta t_m}^{t_o+(k+1)T+\Delta t_m} S(t-\Delta t_m)\cdot F_m(t-\Delta t_m)\,dt$$

the summation corresponding to this and divided by $s$, $$\frac{1}{s}\sum_{\xi=1}^{s} S\left(t_o+kT+\frac{\xi-\frac{1}{2}}{s}T\right)\cdot F_m\left(t_o+kT+\frac{\xi-\frac{1}{2}}{s}T\right)$$

is obtained from the products which, in the $s$ individual time divisions of the determination period extending from the moment $(t_o+kT+\Delta t_m)$ to the moment $(t_o+(k+1)T+\Delta t_m)$. are obtained by multiplying the value $S(t_o+kT+(\xi-\frac{1}{2}/s)T)$ of the time, shifted summation signal $S(t-\Delta t_m)$ in the particular $\xi^{th.}$ time division of the determination period by the value $F_m(t_o+kT+(\xi-\frac{1}{2}/s)T)$ of the time function $F_m(t-\Delta t_m)$ in period synchrony with the time-shifted summation signal in that $\xi^{th.}$ time division.

10. A method as claimed in claim 9, in which the time-shifted summation signal S in each individual time division is multiplied by each of the $n$ time function $F_l$ to $F_n$ and the $n$ products $S.F_l$ to $S.F_n$ of those multiplications are added singly in sequence, in the final output-side stage of an $n$-stage shift register forming a closed ring by connection of its output to its input, to whatever value is held therein; and in which, after each such addition, the values held in the individual stages of the shift register are shifted one stage forward, so that the values held in the shift register carry out one complete circuit in the shift register during every time division and accordingly the products $S.F_m$ associated with a given $m^{th.}$ signal and formed in successive time divisions, in each instance one time division apart, are added together in the shift register, so that within one determination period the said sum of the products $S.F_m$ is formed.

11. A method as claimed in claim 10, in which $q$ immediately consecutive words, each comprising $p$ units of information in $p$ successive positions and of which the first word in a $z^{th.}$ evaluation cycle starts at an initial point in time $t_A=t_o+k_oT+(z-1)pqT+\Delta t_m$, are evaluated for determining the information content, the sum $$\sum_{y=1}^{q}\frac{1}{T}\int_{t_A+(x-1+p(y-1))T}^{t_A+(x+p(y-1))T} S(t-\Delta t_m)\cdot F_m(t-\Delta t_m)\,dt$$

being formed, for each position of these words, of the integration results of all $q$ words in this $x^{th.}$ position, and a binary decision for the position concerned being made, preferably with the aid of threshold-value circuitry, on the basis of the result of that summation and in which, over a complete evaluation cycle comprising p.q consecutive determination periods, the connection between the output and input of the $n$-stage shift register is broken between every two consecutive determination periods, following which the output of the $n$-stage shift register is connected to the input of a further shift register having $(p-1).n$ stages and the input of the $n$-stage shift register is connected to the output of that further register and then, in the ring thus formed from the $n$-stage shift register and the further shift register, the values in the individual register stages are shifted forward $n$ stages at a time, after which the further shift register is separated again from the $n$-stage shift register and connection is re-established between the output and input of the $n$-stage shift register and then, at the end of the evaluation cycle, the values in the $n$-stage shift register and in the further shift register, each of which constitutes the sum $$\frac{1}{s}\sum_{y=1}^{q}\sum_{\xi=1}^{s} S\Big[t_o+(k_o+(x-1))+p(y-1)+pq(z-1)+\frac{\xi-\frac{1}{2}}{s}T\Big]\cdot F_m\Big[t_o+(k_o+(x-1))+p(y-1)+pq(z-1)+\frac{\xi-\frac{1}{2}}{s}T\Big]$$

of the integration results of an $x^{th.}$ position of all the $q$ words delivered over an $m^{th.}$ signal channel in the $z^{th.}$ evaluation cycle just ended, are withdrawn from these two shift registers, a fresh evaluation cycle being started after withdrawal of the values from the $n$-stage shift register.

12. A method as claimed in claim 11, in which, for withdrawing the values stored in the two shift registers, the connection is broken between the input and output of the $n$-stage shift register and its output is connected to the input of the further shift register and the values in both the registers are then, by further shifting by n.p stages, discharged from the two registers via the output of the further register, and after the first $n$-stage shift the $n$-stage shift register thereby cleared is again separated from the further shift register and connection is re-established between input and output of the $n$-stage shift register, whereupon the fresh evaluation cycle starts.

13. A method as claimed in claim 1, in which, for transmitting information from several differently located senders to a common reception point, the common signal path is routed from the reception point through each of the send locations, a separate sender being provided at each send location and a central receiver at the common reception point; and in which, for filtering out, in the central receiver, the information allotted to the individual channels from the summation signal arriving at the reception point, $n$ period-synchronous time functions $F_1$ to $F_n$ are generated and, for synchronisation of the carrier signals contained in the summation signal arriving at the reception point, synchronising signals are generated with those time functions and fed to the receiver and to the individual senders and with their aid in the receiver the start of cycle of the time functions $F_1$ to $F_n$, and in the individual senders the start of cycle of the carrier signals applied to the common signal path by the sender concerned, are so determined that the carrier signals, after transmission from the sender concerned to the central receiver, which requires a certain transmission time, are at least apporximately in period synchrony at the reception point with the time functions $F_1$ to $F_n$ generated in the receiver.

14. A method as claimed in the claim 13, in which the synchronising signals passed to the receiver and the individual senders trigger the start of cycle of the time functions $F_1$ to $F_n$ generated in the receiver as they arrive in the receiver and trigger the start of cycle of the carrier signals applied to the common signal path by the sender concerned as they arrive in the individual senders; and in which the orthonormal functions $F_1(t)$ to $F_n(t)$ chosen are Walsh functions, the cycle of which is divided into $s$ equal time divisions, at the transitions from the first to the next of which may lie abrupt variations in the Walsh functions, $s$ being a power of two which is at least equal to that power of two which is next higher in relation to $n$; and in which the duration chosen for the time divisions is greater than the time summation derived from the transmission time of the synchronising sig-signals from the receiver to the most distant sender on the common signal path and the transmission time of the carrier signals from that most distant sender to the receiver.

15. A method as claimed in claim 13, in which control signals derived from the synchronising signals fed to the receiver cause within the receiver a backward shift of the start of cycle of the time functions $F_1$ to $F_n$ generated therein, in relation to the synchronising signals generated in the receiver, by a time interval at least equal to the time summation derived from the transmission time of the synchronising signals from the receiver to the nearest sender on the common signal path and the transmission time of the carrier signals from that nearest sender to the receiver, and at most equal to the time summation derived from the transmission time of the synchronising signals from the receiver to the most distant sender on the common signal path and the transmission time of the carrier signals from that most distant sender to the receiver, and preferably equal to the mean value between those two time summations, those control signals preferably following the synchronising signals in the said time interval and, as they arise, triggering the start of cycle of the time functions $F_1$ to $F_n$ generated in the receiver; and in which the synchronising signals fed to the senders, as they appear in the individual senders, trigger the start of cycle of the carrier signals applied by the sender concerned to the common signal path; and in which the orthonormal functions $F_1(t)$ to $F_n(t)$ chosen are Walsh functions, the cycle of which is divided into $s$ equal time divisions, at the transitions from the first to the next of which may lie abrupt variations in the Walsh functions, $s$ being a power of two which is at least equal to that power of two which is next higher in relation to $n$; and in which the chosen duration of the time divisions is both greater than the difference between the duration of the said time interval required in all for transmission of the synchronising signals from the receiver to the nearest sender and for transmission of the carrier signals from the nearest sender to the receiver, and greater than the difference resulting between the time required in all for transmission of the synchronising signals from the receiver to the most distant sender and for transmission of the carrier signals from the most distant sender to the receiver and the length of the said time interval.

16. A method as claimed in claim 13, in which, in the individual senders, the start of cycle of the carrier signals applied by the sender concerned to the common signal path is shifted forward in time, in relation to the start of cycle of the time functions $F_1$ to $F_n$ generated in the receiver, by the transmission time from the sender concerned to the central receiver and this forward shift is maintained by the synchronising signals fed by the central receiver.

17. A method as claimed in claim 14, in which control signals derived from the synchronising signals fed to the receiver and the individual senders cause in the receiver a backward shift of the start of cycle of the time functions $F_1$ to $F_n$ generated therein and in the individual senders a backward shift of the start of cycle of the carrier signals generated therein, in each instance by a time interval, in relation to the synchronising signals supplied, which, at the receiver, equals the time summation derived from the transmission time of the synchronising signals from the receiver to the most distant sender on the common signal path and the transmission time of the carrier signals from that most distant sender to the receiver and an additional time shift lying optionally between zero and the time difference between two successive synchronising signals and, at the individual senders, equals the time summation derived from the transmission time of the synchronising signals from the sender concerned to the most distant sender and the transmission time of the carrier signals from the most distant sender to the sender concerned and the said additional time shift, the control signals derived from the synchronising signals preferably following the synchronising signals provided in the said time interval and, as they appear, triggering the start of cycle of the time functions $F_1$ to $F_n$ in the receiver and the start of cycle of the carrier signals in the individual senders.

18. A method as claimed in claim 17, in which the synchronising signals are generated periodically and the additional time shift is equal to the difference between the duration of a synchronising signal cycle and the total time required for transmission of the synchronising signal from the receiver to the most distant sender and for transmission of the carrier signals from the most distant sender to the receiver, so that the time interval by which the control signals in the receiver cause a backward shift in the start of cycle of the time functions $F_l$ to $F_n$ generated therein in relation to the synchronising signals fed to the receiver is equal to the duration of a synchronising signal cycle and hence the periodically generated synchronising signals themselves can be used as control signals in the receiver.

19. A method as claimed in claim 13, in which the units of information in the individual signal channels are supplied by associated sources of information in the form of immediately consecutive words, each of which comprises a pre-determined number $p$ — the same for all words supplied on the same signal channel — of binary units of information, the words that contain the information preferably being repeated, when the units of information of the information sources remain unchanged, until the units of information change; and in which, on each of the $n$ signal channels, each of the words supplied comprises a number $p$ — the same number for all words — of binary units of information; and in which the synchronising signals are generated periodically and the chosen duration of a synchronising signal cycle is equal to the duration of a word, and in which, in the individual senders, the start of each of the words supplied by the associated information sources is set to the same moment as the start of cycle set by means of the synchronising signals for the carrier signals applied by the sender concerned to the common signal path, so that each of the words from all senders, after transmission from the sender concerned to the central receiver, starts at least approximately at the same moment at the reception point.

20. A method as claimed in claim 11, in which, for transmitting information from several differently located senders to a common reception point, the common signal path is routed from the reception point through each of the send locations, a separate sender being provided at each send location and a central receiver at the common reception point; and in which, for filtering out, in the central receiver, the information allotted to the individual channels from the summation signal arriving at the reception point, $n$ period-synchronous time functions $F_l$ to $F_n$ are generated and, for synchronisation of the carrier signals contained in the summation signal arriving at the reception point, synchronising signals are generated with those time functions and fed to the receiver and to the individual senders and with their aid in the receiver the start of cycle of the time functions $F_l$ to $F_n$, and in the individual senders the start of cycle of the carrier signals applied to the common signal path by the sender concerned, are so determined that the carrier signals, after transmission from the sender concerned to the central receiver, which requires a certain transmission time, are at least approximately in period synchrony at the reception point with the time functions $F_l$ to $F_n$ generated in the receiver; and in which the synchronising signals are generated periodically and the chosen duration of a synchronising signal cycle is equal to the duration of an evaluation cycle comprising $q$ consecutive words, and in which, in the individual senders, the start of the first words in each evaluation cycle supplied by the associated information sources is set to the same moment as the start of cycle set by means of the synchronising signals for the carrier signals applied by the sender concerned to the common signal path, so that each of the first words in each evaluation cycle from all senders, after transmission from the sender concerned to the central receiver, starts at least approximately at the same moment at the reception point.

21. A method as claimed in claim 13, in which, as period-synchronous time functions $F_l$ to $F_n$ and as carrier signals, use is made of Walsh functions, the cycle of which is divided into $s$ equal time divisions, $s$ being a power of two, $2^r$, which is at least equal to the power of two next above $n$, and in the central receiver a timing oscillation in the form of a square pulse with a duration corresponding to twice the time division is generated and sent to the individual senders, the timing oscillation being used in the receiver for generating the Walsh functions constituting the time functions $F_l$ to $F_n$ and in the individual senders for generating the Walsh functions constituting the carrier signals applied by the sender concerned to the common signal path.

22. A method as claimed in claim 21, in which the Walsh functions in the receiver and in the individual senders are derived from Rademacher functions, which in turn are generated from the timing oscillation by means of an $(r-1)$-stage binary counter controlled by the timing oscillation and stepping one count forward for every cycle of the timing oscillation, and, for deriving a predetermined Walsh function from the Rademacher functions arising at the counter input and at the count-stage outputs of the $(r-1)$-stage binary counter, pre-determined Rademacher functions appropriate to the Walsh functions to be derived are selected and the binary values represented by these are added on a binary basis in the binary zero order position and, according to the binary decision arising as the result of that addition, one or other of the two functions values which a Walsh function can assume is set up, the function value thus set up being the function value of the derived Walsh function in the time division associated with the count of the $(r-1)$-stage binary counter and the function value of the timing oscillation.

23. A method as claimed in claim 10, in which, for transmitting information from several differently located senders to a common reception point, the common signal path is routed from the reception point through each of the send locations, a separate sender being provided at each send location and a central receiver at the common reception point; and in which, for filtering out, in the central receiver, the information allotted to the individual channels from the summation signal arriving at the reception point, $n$ period-synchronous time functions $F_l$ to $F_n$ are generated and, for synchronisation of the carrier signals contained in the summation signal arriving at the reception point, synchronising signals are generated with those time functions and fed to the receiver and to the individual senders and with their aid in the receiver the start of cycle of the time functions $F_I$ to $F_n$, and in the individual senders the start of cycle of the carrier signals applied to the common signal path by the sender concerned, are so determined that the carrier signals, after transmission from the sender concerned to the central receiver, which requires a certain transmission time, are at least approximately in period synchrony at the reception point with the time functions $F_I$ to $F_n$ generated in the receiver; and in which as period-synchronous time functions $F_I$ to $F_n$ and as carrier signals, use is made of Walsh functions, the cycle of which is divided into $s$ equal time divisions, $s$ being a power of two, $2^r$, which is at least equal to the power of two next above $n$, and in the central receiver a timing oscillation in the form of a square pulse with a duration corresponding to twice the time division is generated and sent to the individual senders, the timing oscillation being used in the receiver for generating the Walsh functions constituting the time functions $F_I$ to $F_n$ and in the individual senders for generating the Walsh functions constituting the carrier signals applied by the sender concerned to the common signal path; and in which the Walsh functions in the receiver and in the individual senders are derived from Rademacher functions, which in turn are generated from the timing oscillation by means of an $(r-1)$-stage binary counter controlled by the timing oscillation and stepping one count forward for every cycle of the timing oscillation, and, for deriving a predetermined Walsh function from the Rademacher functions arising at the counter input and at the count-stage outputs of the $(r-1)$-stage binary counter, pre-determined Rademacher functions appropriate to the Walsh functions to be derived are selected and the binary values represented by these are added on a binary basis in the binary zero order position and, according to the binary decision arising as the result of that addition, one or other of the two functions values which a Walsh function can assume is set up, the function value thus set up being the function value of the derived Walsh function in the time division associated with the count of the $(r-1)$-stage binary counter and the function value of the timing oscillation; and in which, in the receiver, to generate the function values of all $n$ Walsh functions constituting the time functions $F_I$ to $F_n$, in every individual time division, each of the $r$ Rademacher functions arising at the counter input and at the outputs of the various counting stages of the $(r-1)$-stage binary counter is applied to a line connected to the input and output concerned, which is routed through and can be completed by an electronic switch, each of those electronic switches being operated by one of the $r$ counting stages in a further $r$-stage binary counter, which passes through $n$ pre-determined count positions in every time division, and is opened or closed according to the position of the counting stage by which it is operated; and in which, over the lines when thus completed, the binary-values represented by the Rademacher functions applied to those completed lines—and, over the lines when not so completed, the binary values zero—are fed into an adding device, in which the binary values fed in from all the lines are added binarily in the binary zero order position and by which, according to the binary decision of the number produced as the result of that addition, one or other of the function values which a Walsh function can assume is set up, the function value so set up being the function value of the Walsh function associated with the instantaneous count of the said $r$-stage binary counter in the time division associated with the count of the $(r-1)$-stage binary counter and the function value of the timing oscillation.

24. A method as claimed in claim 14, in which as period-synchronous time functions $F_I$ to $F_n$ and as carrier signals, use is made of Walsh functions, the cycle of which is divided into $s$ equal time divisions, $s$ being a power of two, $2^r$, which is at least equal to the power of two next above $n$, and in the central receiver a timing oscillation in the form of a square pulse with a duration corresponding to twice the time division is generated and sent to the individual senders, the timing oscillation being used in the receiver for generating the Walsh functions constituting the time functions $F_I$ to $F_n$ and in the individual senders for generating the Walsh functions constituting the carrier signals applied by the sender concerned to the common signal path; and in which the Walsh functions in the receiver and in the individual senders are derived from Rademacher functions, which in turn are generated from the timing oscillation by means of an $(r-1)$-stage binary counter controlled by the timing oscillation and stepping one count forward for every cycle of the timing oscillation, and, for deriving a pre-determined Walsh function from the Rademacher functions arising at the counter input and at the count-stage outputs of the $(r-1)$-stage binary counter, pre-determined Rademacher functions appropriate to the Walsh functions to be derived are selected and the binary values represented by these are added on a binary basis in the binary zero order position and, according to the binary decision arising as the result of that addition, one or other of the two functions values which a Walsh function can assume is set up, the function value thus set up being the function value of the derived Walsh function in the time division associated with the count of the $(r-1)$-stage binary counter and the function value of the timing oscillation; and in which the $(r-1)$-stage binary counters in the receiver and in the individual senders are set, by the synchronising signals fed to the receiver and the individual senders, to the start-of-cycle count level, preferably zero.

25. A method as claimed in claim 15, in which as period-synchronous time functions $F_I$ to $F_n$ and as carrier signals, use is made of Walsh functions, the cycle of which is divided into $s$ equal time divisions, $s$ being a power of two, $2^r$, which is at least equal to the power of two next above $n$, and in the central receiver a timing oscillation in the form of a square pulse with a duration corresponding to twice the time division is generated and sent to the individual senders, the timing oscillation being used in the receiver for generating the Walsh functions constituting the time functions $F_I$ to $F_n$ and in the individual senders for generating the Walsh functions constituting the carrier signals applied by the sender concerned to the common signal path; and in which the Walsh functions in the receiver and in the individual senders are derived from Rademacher functions, which in turn are generated from the timing oscillation by means of an $(r-1)$-stage binary counter controlled by the timing oscillation and stepping one count forward for every cycle of the timing oscillation, and, for deriving a pre-determined Walsh function from the Rademacher functions arising at the counter input and at the count-stage outputs of the $(r-1)$-stage binary counter, pre-determined Rademacher functions appropriate to the Walsh functions to be derived are selected and the binary values represented by these are added on a binary basis in the binary zero order position and, according to the binary decision arising as the result of that addition, one or other of the two functions values which a Walsh function can assume is set up, the function value thus set up being the function value of the derived Walsh function in the time division associated with the count of the $(r-1)$-stage binary counter and the function value of the timing oscillation; and in which the $(r-1)$-stage binary counter in the receiver is set in each instance, by setting pulses constituting the said control signals, which occur at least approximately at the same moment as the synchronising signals that give rise to them, to a count level which is in advance of the start-of-cycle count, preferably zero, of that binary counter by the said time interval or by a number of count units corresponding to the quotient of time interval/time division: and in which the $(r-1)$-stage binary counters in the individual senders are set to the start-of-cycle count level, preferably zero, by the synchronising signals associated with the individual senders.

26. A method as claimed in claim 17, in which as period-synchronous time functions $F_l$ to $F_n$ and as carrier signals, use is made of Walsh functions, the cycle of which is divided into $s$ equal time divisions, $s$ being a power of two, $2^r$, which is at least equal to the power of two next above $n$, and in the central receiver a timing oscillation in the form of a square pulse with a duration corresponding to twice the time division is generated and sent to the individual senders, the timing oscillation being used in the receiver for generating the Walsh functions constituting the time functions $F_l$ to $F_n$ and in the individual senders for generating the Walsh functions constituting the carrier signals applied by the sender concerned to the common signal path; and in which the Walsh functions in the receiver and in the individual senders are derived from Rademacher functions, which in turn are generated from the timing oscillation by means of an $(r-1)$-stage binary counter controlled by the timing oscillation and stepping one count forward for every cycle of the timing oscillation, and, for deriving a pre-determined Walsh function from the Rademacher functions arising at the counter input and at the count-stage outputs of the $(r-1)$-stage binary counter, pre-determined Rademacher functions appropriate to the Walsh functions to be derived are selected and the binary values represented by these are added on a binary basis in the binary zero order position and, according to the binary decision arising as the result of that addition, one or other of the two functions values which a Walsh function can assume is set up, the function value thus set up being the function value of the derived Walsh function in the time division associated with the count of the $(r-1)$-stage binary counter and the function value of the timing oscillation; and in which the $(r-1)$-stage binary counters in the receiver and in the individual senders are set in each instance, by setting pulses constituting the said control signals, which occur at least approximately at the same moment as the synchronising signals that give rise to them, to a count level which is in advance of the start-of-cycle count, preferably zero, of the binary counter to which the setting pulses are applied, by the said time interval associated with the receiver or sender in which that binary counter is incorporated or by a number of count units corresponding to the quotient of time interval/time division derived from that time interval and from the time division.

27. A method as claimed in the claim 13, in which the orthonormal functions $F_l(t)$ to $F_n(t)$ chosen are Walsh functions, the cycle of which is divided into $s$ equal time divisions, at the transitions from the first to the next of which may lie abrupt variations in the Walsh functions, $s$ being a power of two which is at least equal to that power of two which is next higher in relation to $n$; and in which a two-core cable is used as the common signal path, an impedance, preferably an ohmic resistance and a voltage source in series being connected to the two conductors in the cable at the reception point, and the summation signal that arrives at the reception point is picked up via the impedance; and in which, at each sending point, for each separate signal channel over which information is supplied at the sender concerned, there is connected to each conductor in the cable a separate series arrangement for the signal channel concerned, consisting of a further impedance, preferably also an ohmic resistance and an electronic switch; and in which the electronic switch, when the carrier signal allotted to the signal channel concerned is not applied to the common signal path, is moved to one or other of its two switching positions "open" and "closed"—preferably to the "open" position—and, when the carrier signal consisting of a Walsh function allotted to the signal channel concerned is applied to the common signal path, is moved to one of its two switching positions when the Walsh function constituting the carrier signal assumes one of the two function values which that Walsh function can assume, and is moved to the other of its two switching positions when the Walsh function constituting the carrier signal assumes the other of the two function values which that function can assume.

28. A method as claimed in claim 27, in which the further impedances in the series arrangements connected to line at the individual sending points are such that when any electronic switch is closed in the series arrangements connected to line at the individual sending points, the same increase in voltage occurs in each instance at the impedance forming part of the series arrangements at the reception point, ohmic resistances preferably being used as impedances in all the series arrangements and the magnitudes chosen for those ohmic resistances being equal in each case to the difference between a pre-determined resistance value, higher than the ohmic line resistance from the reception point to the sending point most distant along the line, and the value of the ohmic line resistance from the reception point and that sending point at which the series arrangement incorporating the ohmic resistance concerned is connected to line.

29. The application of the method as claimed in claim 1 to the automatic monitoring, from a central point, of a number of measuring points situated at different locations, a sender being provided at each measuring point and a receiver at the central point, the measuring values obtained at the various measuring points being transmitted to the receiver in each instance by the sender associated with the measuring point concerned.

30. Application as claimed in claim 29 to cable monitoring and in particular to the monitoring of a high tension cable in regard to its temperature by temperature sensing and in regard to possible leaks by detecting any leakage of cable oil and by detecting any penetration of water into the cable.

* * * * *